United States Patent
Krishnamurthy et al.

(10) Patent No.: US 11,403,681 B1
(45) Date of Patent: **\*Aug. 2, 2022**

(54) SMS-BASED REVIEW REQUESTS

(71) Applicant: Reputation.com, Inc., Redwood City, CA (US)

(72) Inventors: Sathya Krishnamurthy, Fremont, CA (US); Manish Balsara, Foster City, CA (US); Shrey A. Bhatia, Los Altos, CA (US)

(73) Assignee: Reputation.com, Inc., San Ramon, CA (US)

( * ) Notice: Subject to any disclaimer, the term of this patent is extended or adjusted under 35 U.S.C. 154(b) by 372 days.

This patent is subject to a terminal disclaimer.

(21) Appl. No.: 16/550,626

(22) Filed: Aug. 26, 2019

Related U.S. Application Data

(63) Continuation of application No. 15/210,812, filed on Jul. 14, 2016, now Pat. No. 10,445,794.

(60) Provisional application No. 62/247,408, filed on Oct. 28, 2015.

(51) Int. Cl.
| | |
|---|---|
| *G06Q 10/06* | (2012.01) |
| *G06Q 30/06* | (2012.01) |
| *G06Q 30/02* | (2012.01) |
| *G06Q 50/00* | (2012.01) |
| *H04W 4/14* | (2009.01) |

(52) U.S. Cl.
CPC ......... *G06Q 30/0282* (2013.01); *G06Q 50/01* (2013.01); *H04W 4/14* (2013.01)

(58) Field of Classification Search
CPC ...... G06Q 30/0282; G06Q 50/01; H04W 4/14
USPC .......................................... 705/1.1, 347, 319
See application file for complete search history.

(56) References Cited

U.S. PATENT DOCUMENTS

| | | | |
|---|---|---|---|
| 9,626,405 B2 | 4/2017 | Chow | |
| 9,875,310 B2 | 1/2018 | Chow | |
| 2008/0071602 A1* | 3/2008 | Ojakaar | G06Q 30/0278 705/14.44 |
| 2011/0125796 A1* | 5/2011 | Singh | G06Q 30/02 707/781 |
| 2013/0346172 A1* | 12/2013 | Wu | G06Q 30/0251 705/14.16 |
| 2015/0213522 A1* | 7/2015 | Gao | G06Q 30/0282 705/347 |
| 2016/0267505 A1 | 9/2016 | Murphy | |

OTHER PUBLICATIONS

Minnich et al., TrueView: Harnessing the Power of Multiple Review Sites, Proceedings of the 24th International Conference on World Wide Web, 2015.

\* cited by examiner

*Primary Examiner* — Jonathan P Ouellette
(74) *Attorney, Agent, or Firm* — Van Pelt, Yi & James LLP

(57) ABSTRACT

Facilitating requests of reviews is disclosed. Contact information associated with a potential reviewer is obtained. A message requesting the potential reviewer to write a review for an entity is transmitted. In response to receiving an indication that the potential reviewer has accepted the request to write the review for the entity, a review site on which the potential reviewer should be directed to write the review for the entity is dynamically determined. A device associated with the potential reviewer is directed to a profile page of the entity on the dynamically determined review site.

17 Claims, 19 Drawing Sheets

| Industry | Sub-Industry | Volume | Site A | Site B | Site C | ... | Health | Care | Nursing | Used Car | Dealer | Car Rental |
|---|---|---|---|---|---|---|---|---|---|---|---|---|
| Automotive | Sales | 80 | 30.0% | 20.0% | 7.0% | | | | | 4.0% | 22.0% | |
| Automotive | Rental | 20 | 30.0% | 20.0% | 7.0% | | | | | | | 30.0% |
| Automotive | Repair / Parts | 20 | 30.0% | 20.0% | 7.0% | | | | | | | |
| Automotive | Automotive Other | 20 | 35.0% | 27.0% | 12.0% | | | | | | | |
| Health Care | Hospitals / Facilities | 20 | 30.0% | 20.0% | 7.0% | | 23.0% | 7.0% | | | | |
| Health Care | Elder Care | 20 | 30.0% | 20.0% | 7.0% | | | | | | | |
| Housing | Hotel / Motel | 80 | 29.0% | 8.0% | 7.0% | | 7.0% | | 15.0% | | | |
| Restaurants | Carry out | 80 | 30.0% | 23.0% | 4.0% | | | | | | | |
| Restaurants | Restaurants Other | 80 | 30.0% | 23.0% | 4.0% | | | | | | | |
| Technology | ISP | 20 | 35.0% | 27.0% | 12.0% | | | | | | | |
| Technology | Cellular | 20 | 35.0% | 27.0% | 12.0% | | | | | | | |
| Technology | Electronics | 20 | 35.0% | 27.0% | 12.0% | | | | | | | |
| Special events | Party Venues | 20 | 30.0% | 20.0% | 7.0% | | | | | | | |
| Special events | Event Planners | 20 | 30.0% | 20.0% | 7.0% | | | | | | | |
| Retail | Department Stores | 20 | 35.0% | 27.0% | 12.0% | | | | | | | |
| Retail | Retail Clothing | 20 | 35.0% | 27.0% | 12.0% | | | | | | | |
| Retail | Supermarkets | 20 | 35.0% | 27.0% | 12.0% | | | | | | | |
| Travel | Travel Agents | 20 | 30.0% | 20.0% | 7.0% | | | | | | | |
| Travel | Tours | 20 | 30.0% | 20.0% | 7.0% | | | | | | | |

FIG. 16

SMS-BASED REVIEW REQUESTS

CROSS REFERENCE TO OTHER APPLICATIONS

This application is a continuation of co-pending U.S. patent application Ser. No. 15/210,812, entitled SMS-BASED REVIEW REQUESTS filed Jul. 14, 2016 which is incorporated herein by reference for all purposes, which claims priority to U.S. Provisional Application No. 62/247,408, entitled SMS BASED REQUEST REVIEWS filed Oct. 28, 2015 which is incorporated herein by reference for all purposes.

BACKGROUND OF THE INVENTION

Businesses are increasingly concerned with their online reputations. For example, both positive and negative reviews posted to a review website can impact revenue. As more review websites are created, and as more users post more content to those sites, it is becoming increasingly difficult for businesses to monitor such sites. Further, it can be challenging for businesses to generate reviews for the business's profile pages. For example, customers of the business may become busy or find it inconvenient to write reviews.

BRIEF DESCRIPTION OF THE DRAWINGS

Various embodiments of the invention are disclosed in the following detailed description and the accompanying drawings.

FIG. 16 illustrates an example of a target distribution.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Short Message Service (SMS)/Mobile-Email-based review requests provide a way for entities such as businesses to have reviews on their online business pages by leveraging mobile technology. As usage of mobile devices such as smartphones has increased, for example, compared to desktop usage, businesses are increasingly finding the efficacy of traditional email-based requesting of reviews becoming reduced. SMS-based review requests can provide an alternative by leveraging, for example, mobile applications ("apps") installed on an end-user's device together with a business's profile pages to entice or encourage customers to leave a review. Using the techniques described herein, reputation scoring (described in further detail below) can be leveraged to select and choose what apps to launch on an end user's (potential reviewer's) mobile device.

Figure 1:
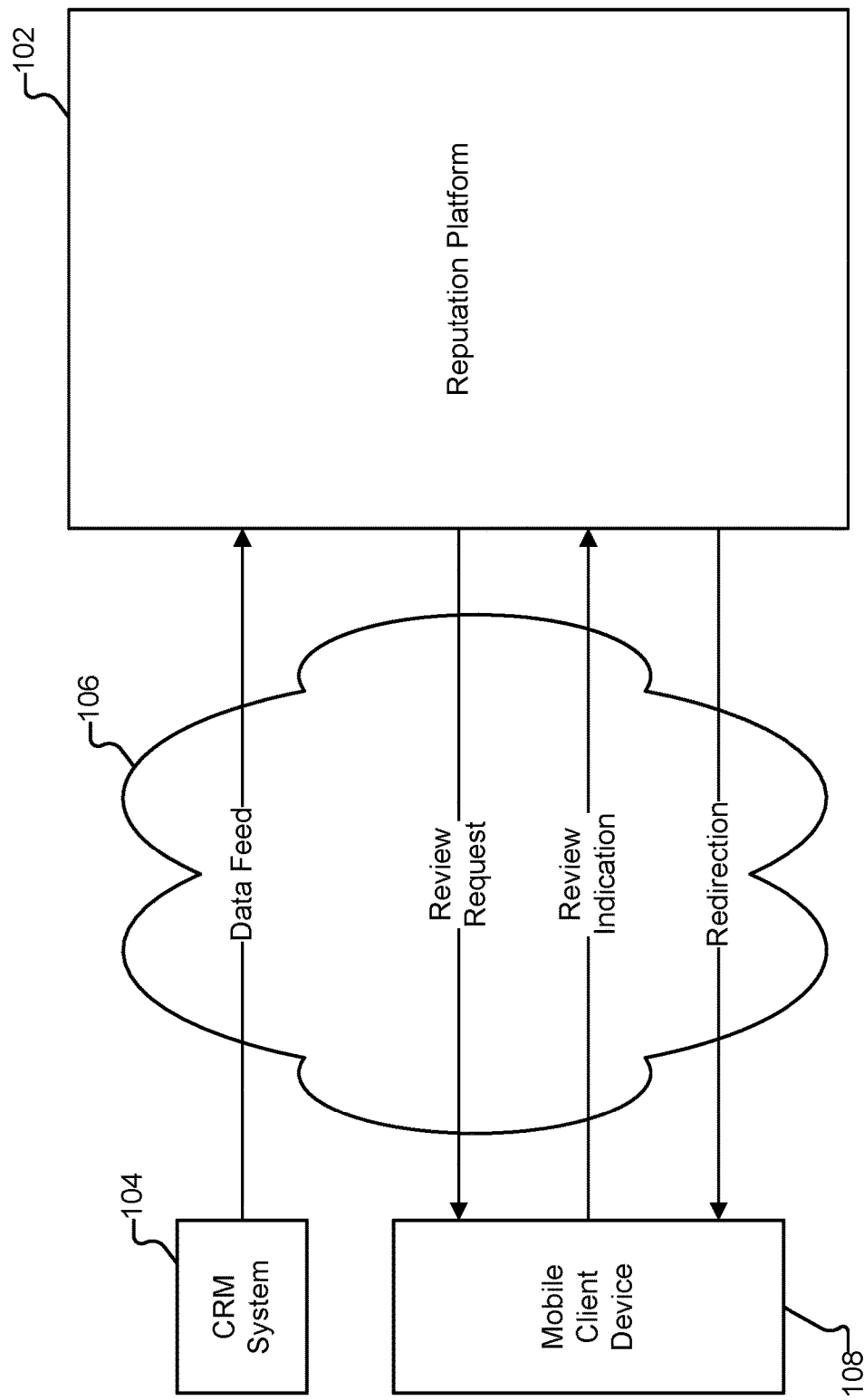
FIG. 1 illustrates an embodiment of an environment in which SMS-based review requests are performed.

FIG. 1 illustrates an embodiment of an environment in which SMS-based review requests are performed. In this example, suppose that a business, Acme Dentistry, is a customer of reputation platform 102. Acme Dentistry can access the services of reputation platform 102 to track the reputation of their business. Reputation platform 102 is configured to collect reputation and other data from a variety of sources, including review websites, social networking websites, and other websites. As will be described in further detail below, platform 102 is configured to use the collected data to assist businesses such as Acme Dentistry in strategically obtaining additional reviews.

Review sites include general purpose review sites that allow users to post reviews regarding all types of businesses. Examples of such review sites include Google Places, Google+, Yahoo! Local, and Citysearch. Review sites can also include travel-oriented review sites, such as TripAdvisor, that allow users to post reviews of hotels, restaurants, and attractions. Review sites can also be specific to a particular type of business, such as car dealers, healthcare professionals and/or facilities, etc. Examples of social networking sites include Twitter, Foursquare, and Facebook.

Platform 102 is illustrated as a single logical device in FIG. 1. In various embodiments, platform 102 is a scalable, elastic architecture and may comprise several distributed components, including components provided by one or more third parties. Further, when platform 102 is referred to as performing a task, such as storing data or processing data, it is to be understood that a sub-component or multiple sub-components of platform 102 (whether individually or in cooperation with third party components) may cooperate to perform that task. In some embodiments, platform 102 (or portions thereof, as applicable) is implemented in the Java programming language. Any other appropriate programming language can be used.

In the example environment of FIG. 1, suppose that Richard has had his teeth whitened at Acme Dentistry. His teeth whitening transaction is recorded using a customer relationship management (CRM) system 104 used by Acme Dentistry, such as Dentrix.

CRM system 104 provides, via network 106 (such as the Internet), a data feed of transactions that occurred at Acme Dentistry, including Richard's teeth whitening procedure, to platform 102. The information about Richard's transaction that is sent to platform 102 by CRM system 104 includes details such as Richard's name, a location identifier unique to Acme Dentistry (used by platform 102 to uniquely identify Acme Dentistry), and details about his whitening procedure. The information from the CRM system also includes contact information for Richard, which can include Richard's email address, cell phone number, or any other type of contact information, as appropriate. In this example, suppose that Richard's cell phone number is passed to platform 102.

In response to receiving information about Richard's teeth whitening, platform 102 generates a message requesting that Richard write a review for Acme Dentistry. For example, the message includes text such as "Please take a moment to write a review about your teeth whitening experience at Acme Dentistry." The message also has embedded within it a link (e.g., a Uniform Resource Locator (URL)) that Richard can click on if he is willing to write a review for Acme Dentistry. In some embodiments, the link will direct back to platform 102, and has encoded within it information such as a location ID for Acme Dentistry and a user ID for Richard.

The review request message is sent as a short message service (SMS) message to Richard using the cell phone number that was provided to platform 102. As one example, platform 102 communicates with a service such as Twilio, which takes the message with the embedded link created by platform 102 and generates and pushes out an SMS message to Richard using the provided cell phone number.

Richard receives the SMS review request message on his mobile device 108. Examples of mobile devices include smartphones, tablet computers, phablets, etc. The techniques described herein can be adapted to work with a variety of other client devices, such as personal computers, laptops, etc.

Richard opens the SMS review request message on his smartphone. Clicking on the link causes the mobile browser on Richard's cell phone to open. The browser then opens the link clicked on by Richard, which directs the mobile browser back to platform 102.

In response to being contacted by Richard's mobile device, which indicates to platform 102 that Richard (identified by his user ID encoded in the clicked link) is willing to write a review for Acme Dentistry (identified by the location key encoded in the clicked link), platform 102 is configured to determine a review site on which Richard should write a review for Acme Dentistry. Suppose that Acme Dentistry has profiles on a number of review sites, such as Yelp, Google+, Facebook, WebMD, etc. Reputation platform 102 is configured to determine which of the review sites Richard should be sent to write a review. In some embodiments, platform 102 makes the decision by prioritizing the review sites based on a determination of which sites a given business would benefit from having additional reviews on. As will be described in further detail below, in some embodiments, platform 102 performs the prioritization at least in part by determining how a business's reputation score would change (whether positive or negative) based on stimulating the addition of new reviews to various review sites. The prioritization can also be determined based on an evaluation of whether a location has a sufficient or insufficient number of reviews on a given review or social network site (e.g., according to industry review benchmarks and review distributions).

Suppose that platform 102 determines that of the sites Yelp, Google+, Facebook, and WebMD, Acme Dentistry would benefit most by having additional reviews on Google+, then on Facebook, then on Yelp, and finally on WebMD. In this example, the prioritization is determined dynamically, and on-demand, at the time of Richard clicking on the link in the review request message. This ensures that the prioritization reflects the current or most up-to-date need or benefit to having additional reviews on a review site, which may fluctuate or change over time. For example, if Richard had clicked the link several days later, Yelp might be the highest priority review site, rather than Google+.

In some embodiments, the prioritized list of review sites is pruned. For example, suppose that within the last thirty days (or any other appropriate window of time), Richard had visited Acme Dentistry for a regular tooth cleaning. At that time, Richard was sent to Facebook to write a review. As Richard has already been sent to Facebook in the last thirty days, Facebook is pruned from the prioritized list generated for him after the teeth whitening procedure.

In this example, platform 102 will attempt to cause Richard's mobile device to launch a mobile app for a review site and have it open to Acme Dentistry's profile page. In some embodiments, pruning the list includes pruning the list of review sites that do not have corresponding mobile apps for Richard's mobile device. Information about Richard's mobile device (e.g., operating system, device type, mobile ecosystem such as iOS or Android, etc.) can be inferred or otherwise determined based on obtained information such as a user agent, browser type information (e.g., Safari, Chrome, etc.), etc.

After prioritizing (and pruning) the list of review sites, platform 102 sends Richard's mobile device to Acme Dentistry's profile page on the top review site, Google+. In this example, platform 102 would like to redirect Richard's mobile device to the Google+ mobile app for writing a review for Acme Dentistry, where the Google+ app may or may not be installed on Richard's device.

Platform 102 attempts to cause Richard's smart phone to open the profile for Acme Dentistry on the Google+ app by sending or redirecting him using a link (e.g., Uniform Resource Identifier) that is formatted in a manner recognized by mobile browsers, such that the mobile browser on Richard's device will try to open the Google+ app on device 108.

Platform 102 is configured to determine whether the Google+ app has opened on Richard's phone (i.e., the Google+ app is installed). For example, if the Google+ app is installed on Richard's device, then the Google+ app will be launched immediately, and no errors or callbacks to platform 102 will be returned by the browser. If platform 102 does not receive a callback from the browser after five seconds (or any other appropriate timeout period), then platform 102 assumes that the Google+ app was installed and has been opened on device 108. Richard, after clicking on the link in the review request SMS sent to him automatically after visiting Acme Dentistry, has thus been automatically sent to Acme Dentistry's page on the app for the review site for which it has been determined that Acme Dentistry would receive the most benefit from having additional reviews. Richard can then write the review for Acme Dentistry using the Google+ app that was automatically opened on his device.

Suppose, however, that Richard does not have the Google+ app installed on his smartphone 108. After attempting to open the Google+ app, an error or callback is returned by the browser to platform 102 (within the timeout period) indicating that the Google+ app could not be opened (i.e., because it is not installed on Richard's device). Platform 102 is configured to determine a fallback option.

For example, platform 102 returns to the prioritized list of review sites and selects the next review site on the list, which is Yelp (because Facebook has been pruned from the list). Platform 102 then attempts to open the Yelp app on Richard's device to Acme Dentistry's profile by sending another link to device 108's mobile browser that will cause the device to try to open the Yelp app to Acme Dentistry's profile.

If the Yelp app is also not installed, platform 102 will continue down the list of review sites and attempt to cause the apps for those review sites to open on Richard's device. If none of the apps for the review sites in the prioritized (and pruned) list are installed on Richard's device, then further fallbacks can be provided by platform 102.

For example, platform 102 can attempt to redirect the mobile browser of device 108 to the mobile optimized versions of the review sites. As one example, platform 102 prioritizes (or uses the previous prioritization of) the review sites, where Acme Dentistry would benefit most by having additional reviews on Google+, then on Facebook, then on Yelp, and finally on WebMD. Facebook is pruned out as described above, as Richard has previously been sent to Facebook to write a review within the last thirty days. Additionally, the prioritized list is pruned of review sites that do not provide mobile optimized websites (i.e., web sites that are optimized for a mobile experience on mobile devices). For example, suppose that WebMD does not have a mobile optimized website. WebMD is then pruned or otherwise removed or filtered out from the prioritized list. The resulting prioritized and pruned list includes Google+ followed by Yelp. This ensures that if Richard is directed to a website of either Google+ or Yelp, he will be provided a quality experience for writing reviews on his mobile device.

Platform 102 then attempts to redirect Richard's smartphone mobile browser to Acme Dentistry's page on the Google+ mobile website, for example, by sending the URL for Acme Dentistry's Google+ page to the mobile browser on device 108. Similarly to when attempting to open apps on a device, platform 102 waits (e.g., for a timeout period) for an indication of an error (e.g., callback due to page not rendering on the mobile browser). If no callback is received by platform 102 within the timeout period, then platform 102 assumes that the Acme Dentistry's Google+ page was successfully loaded and opened on the mobile browser.

If, however, a callback is received by platform 102 from device 108 indicating that a page load or rendering error occurred, then platform 102 sends the URL for Acme Dentistry's profile on the next URL in the prioritized and pruned list, which is Yelp.

If none of the mobile websites on the prioritized (and pruned) list could be rendered in the browser on Richard's smartphone, then platform 102 can provide a further fallback. For example, platform 102 can redirect the mobile browser on Richard's smartphone to a mobile optimized review website hosted or otherwise provided by platform 102 (or provided by an entity operating platform 102), also referred to herein as a "kiosk." Richard can then provide a review for Acme Dentistry on the website provided by platform 102.

In the above example, mobile optimized website attempts were made as fallbacks to app attempts. The order can also be reversed, where mobile optimized website attempts are made first, and app attempts are made as a fallback. The app and mobile optimized website attempts need not be fallbacks of each other. For example, after app attempts fail, platform 102 can directly fallback to the platform provided review site, without attempting mobile websites. Similarly, mobile websites can be attempted, with the platform provided review site as a fallback, and without attempting apps for review sites as a fallback.

In the above example, an SMS review request message was sent to Richard's device using his cell phone number. Other communications channels can be used. For example, if Richard's email address was included (in addition to or instead of his cell phone number) in the data feed provided to platform 102 by CRM 104, platform 102 can instead provide the review request message in an email communication to Richard's email address, with the email including review request text and a URL back to the platform 102 as described above.

As will be described in further detail below, the techniques described herein can be used to facilitate driving of traffic to mobile devices, where an increasing number of transactions are occurring. Typically, it may be difficult for users to leave reviews, for example, because it is time-consuming to find and open review sites for a business, or because the mobile experience for leaving reviews on a review site is poor. The mechanisms described herein can reduce the friction in obtaining reviews on mobile devices, encouraging users to write reviews and increasing the conversion rate for a business such as Acme Dentistry to generate reviews. As described in the example environment of FIG. 1, SMS review request messages can be automatically sent to users, where they are notified automatically of the SMS message. The SMS can be easily opened and links embedded in the SMS clicked on, causing the platform to automatically redirect a mobile device to a business's profile on a review sites' app or website, thereby reducing the effort and friction in driving users to the business's profiles on review sites to leave reviews.

Figure 2:
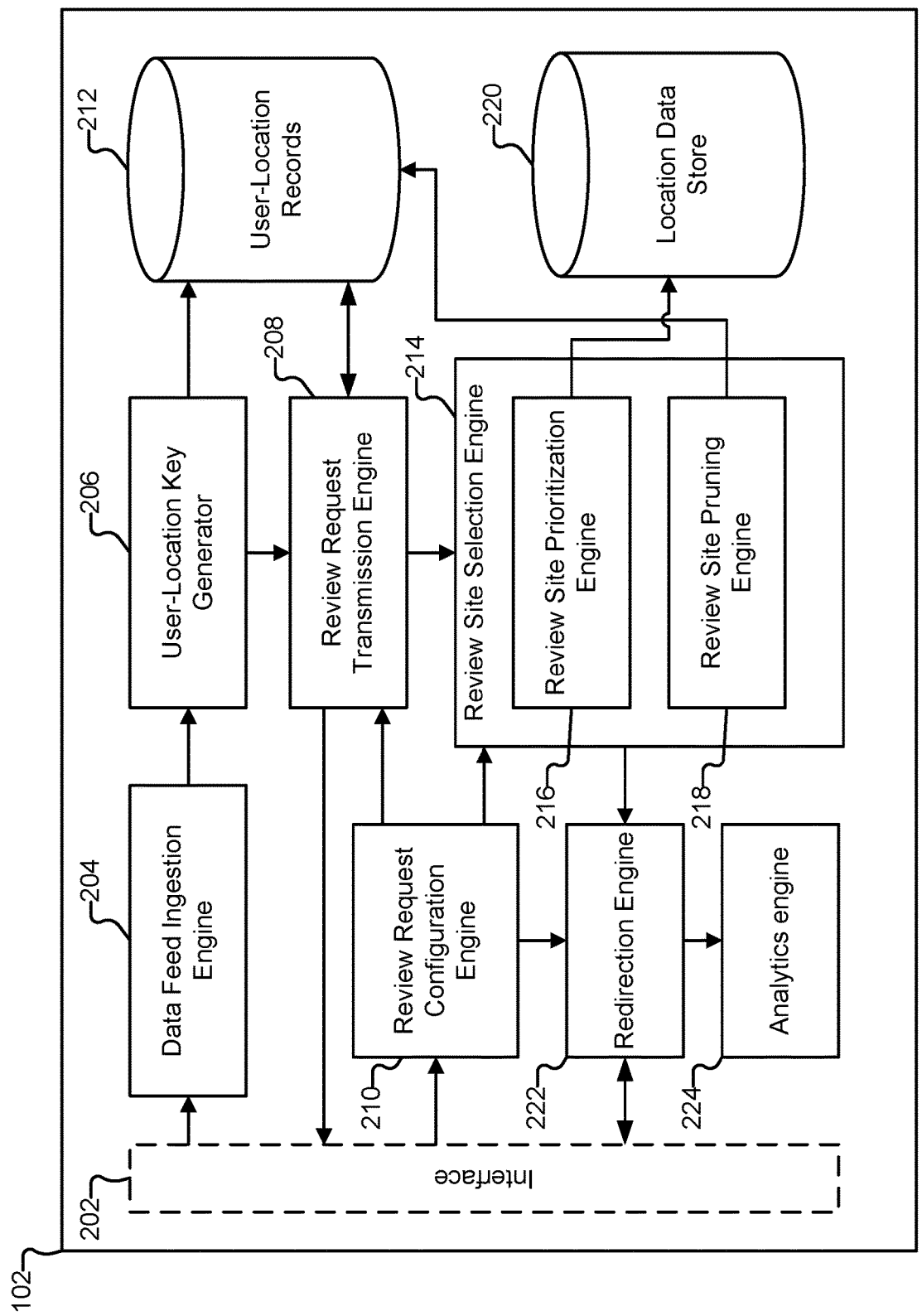
FIG. 2 is an example of components included in embodiments of a reputation platform.

FIG. 2 is an example of components included in embodiments of a reputation platform. In particular, FIG. 2 illustrates components of platform 102 that are used in conjunction with facilitating review requests (e.g., SMS-based review requests).

Platform 102 communicates over a network, (e.g., network 106 of FIG. 1) via interface 202. Interface 202 is configured to communicate with various entities, such as CRM systems, end-user mobile devices, customers of platform 102 (e.g., Acme Dentistry), etc.

For example, as described above, platform 102, via interface 202, receives data feeds from entities such as CRM systems (e.g., CRM system 104 of FIG. 1). In some embodiments, the data feeds include information about a business location's interactions with its customers. Data feeds can be obtained from a variety of CRM systems, where different locations (businesses) in different industries may use different CRM systems. For example, dentists may use Dentrix, while Sitelink is used in the self-storage industry. Healthcare providers may use other CRM systems. Other examples of CRM products include those provided by Salesforce.

The data feeds are ingested and processed using data feed ingestion engine 204. The data feeds can include information captured by CRM systems about transactions that occurred at locations. In the example environment of FIG. 1, information about Richard's teeth whitening transaction with Acme Dentistry was ingested by platform 102. Other examples of transaction information that can be ingested include servicing of cars at auto-dealers, outpatient checkout at healthcare providers, etc.

In some embodiments, the customer interaction or transaction information captured by the business locations (e.g., using CRM systems) and ingested by platform 102 using data feed ingestion engine 204 includes:

A name (e.g., first name, middle name, last name, title, etc.) of a customer of the location (also referred to herein as "end users" or "potential reviewers").
  Contact information associated with the customer, such as an email address and/or a phone number (e.g., mobile or cellular phone number).
  Information about the business location at which the customer interaction occurred. This can include the name, physical or mailing address, phone number, website, etc. of the business location. In some embodiments, the information about the business location includes an identifier of the location (e.g., unique location key known to platform 102, where each business location is associated with a corresponding unique location key) at which the customer interaction occurred.
  Details about the interaction or transaction with the customer that occurred at the location (e.g., visit to the dentist, auto dealer, hospital, etc. and what services or products were provided during the visit).

In some embodiments, data feed ingestion engine 204 is configured to validate the ingested interaction or transaction information. For example, ingestion engine 204 is configured to determine whether the contact information included in the interaction or transaction information is valid. This can include validating that a received email address of the end user customer of the location is a valid email. In various embodiments, validating an email address includes determining whether an email address was provided (e.g., left empty), whether the domain portion of the email address is valid (e.g., whether the domain portion was misspelled), etc. Phone numbers can also be validated to determine, for example, whether they are an appropriate number of digits, include an area code, etc.

In some embodiments, the ingested (and validated) information associated with a customer interaction or transaction at a business location is passed to user-location key generator 206. User-location key generator 206 is configured to use the information associated with the customer transaction or interaction to generate a user-location key that uniquely identifies the combination of end user and business location involved in the customer interaction. In some embodiments, generating the unique key includes generating a user identifier for the customer of the business location. For example, the user identifier for the customer of the location can be based on the contact information (e.g., email address or mobile phone number) obtained in the interaction information. User-location key generator 206 then generates a unique key that is a combination of the generated user id and the unique location key for the location (e.g., location identifier included in the interaction information or provided by platform 102). In some embodiments, the unique user-location key is generated by hashing (e.g., MD5, SHA-1, etc.) the user id and location key. The unique user-location key generated for the combination of user identifier and location key is used to facilitate various aspects of requesting reviews, as will be described in further detail below.

The following is example of a user id, a location key, and a hashed version of the two for the generated unique key. Suppose for example a User Id: john.smith@gmail.com and assume a tenant key of b55114e761b and location code: 001. In this example, platform 1021 generates the following unique id for the user: b568bf60-aaa8-4105-9be4-aa31e29a9fa2. In some embodiments, the tenant-key is unique for each and every customer (of the services provided by platform 102).

Review request transmission engine 208 is configured to generate and transmit a message to a potential reviewer requesting that the end user provide a review for the location.

In some embodiments, the review request message to be sent is generated according to or using a template. For example, the review request template includes text for requesting a review for a location and can include placeholder variables for inserting the name of a location. As one example, the template can include the following text "Please write a review for {location_name}," where the name of the business location for which the review is being requested is obtained using the location key associated with the customer interaction. When generating the message using the template, the obtained location name value is placed at the variable location.

The text can also include other placeholder variables for inserting other types of values. For example, placeholder variables for inserting a potential reviewer's name can be included. Information associated with the particular customer interaction after which the current review request is being generated can also be included. As one example, the text can include a variable for inserting the service that was provided during the customer interaction at the business location (e.g., tooth whitening, transmission fluid change, purchase of a small decaf macchiato, etc.).

In some embodiments, the text also includes an option to unsubscribe. For example, an SMS review request message can include instructions to reply to an SMS with "STOP" if the end user would like to unsubscribe from further communications.

The template for review request messages (e.g., text and variables to include) is customizable and can be configured using review request configuration engine 210.

In some embodiments, the review request message has embedded, or otherwise includes, a link that when clicked on or opened, will direct back to platform 102. For example, the review request message provides instructions that indicate that if the contacted end user or potential reviewer is willing to write a review, they can click on the link embedded in the message. The link, when clicked on, will direct the potential reviewer's device back to platform 102. For example, clicking on the link on a user's mobile device will cause the client device to open a browser and point back to platform 102, as described above.

In some embodiments, the link is a Uniform Resource Locator (URL) that has encoded various pieces of information, such as the unique user-location key generated for the combination of user identifier and location for a given customer interaction.

In some embodiments, as the encoded information may result in a long URL stream, the URL is compressed, for example, using a service such as bit.ly. As one example, the compressed URL is an MD5 string, where the string is unique and generated based on the user id and location key (e.g., unique user-location key).

An example of a compressed URL is goo.gl/3y9WEM. An example of the original URL for the compressed URL is https://surveys.reputation.com/feedback/survey?key=b55114e761b&sid=SURVEY&uuid=b568bf60-aaa8-4105-9be4-aa31e29a9fa2&r=h&ty=1. In some embodiments, platform 102 automatically encodes the URL to generate a shortened or compressed URL.

In some embodiments, the URL can also be placed as a variable in a message template. In addition to message text and variables such as those for adding location and interaction details, as well as for embedding the above described URL, a template can also include a specification of other details for the review request message, such as buttons, HyperText Markup Language (HTML) tags, etc.

The following is an example of a review request message template:

Hi<user_name>, Witt Lincoln invites you to give them a feedback on your recent experience. https://reviews123.co/aBcde3. Reply STOP to unsubscribe As described above, review request messages can be generated according to templates. In some embodiments, different templates can be used depending on the mode of communication channel to be used in sending the message. For example, separate templates can be defined for SMS-based review requests and mobile email-based review requests. For example, an SMS-based review request template can include a more limited number of characters to minimize incurring of text charges.

In some embodiments, the mode or channel of communication used to contact the user is based on what contact information was included or available in the information for the customer interaction. For example, if a mobile phone number was obtained, then an SMS can be sent. If an email address was obtained, then an email can be sent. In some embodiments, messages are sent using a given communications channel only if the contact information for the channel is valid (e.g., email messages are not sent for invalid email addresses). If none of the contact information is valid, then no review request message is sent.

If both a mobile phone number and an email address are available, one of the channels can be used to send the review request message. For example, a business location can configure, via review request configuration engine 210 (e.g., using an interface provided by interface 202), their preferences for how end users should be contacted. For example, the business location (customer of platform 102) can specify that SMS messages should be prioritized before email review request messages and vice versa. As one example, the business location can specify that an SMS message is prioritized first, but if a cell phone number is not available and an email is available, an email message is sent. In some embodiments, a default priority for the communication channels is provided, where the location can override the default priority as desired.

Review request transmission engine 208 is then configured to send a review request message. As one example, if an SMS message is sent using a cell phone number, a (external) service provider such as Twilio can be used. The review request transmission engine sends a generated review request message to the service provider, which in turn converts the review request message into an SMS message. The service provider then pushes the SMS to the user. In some embodiments, the caller ID number associated with the SMS review request message (that will be seen by an end user such as Richard) is a unique identifier allocated to the SMS message.

In some embodiments, a record of the review request message having been sent is stored in user-location records 212. User-location records 212 is used to store information associated with request reviews for different combinations of users and locations. For example, the user-location key generated by user-location key generator 206 (using information associated with a given customer interaction being processed, as described above) is used to access user-location records 212. The hash value for a generated user-location key is compared against stored unique user-location key hash values. If a generated user-location key is new and has not previously been seen (i.e., no record for this combination of user id and location key exists in records 212), then a new record for the generated user-location key is added to records 212. Information associated with the sending of the review request message, such as time and date of the sending of the review request, can be stored to the record.

In some embodiments, if an existing record is identified (e.g., indicating that the user has previously been asked to write a review for the location), then information associated with the review request can be added to the existing record for the particular user-location combination. As will be described in further detail below, existing information associated with previous review requests for a unique user-location key can be obtained from records 212 and used when requesting reviews from the user.

When a user receives a message on the contacted device and clicks on the embedded link (indicating that the user associated with the device has accepted the request to write a review for a location), the contacted device is redirected back to platform 102. For example, the link embedded in the review request message (whether an SMS or email) will cause a device's browser to open. The mobile browser is then directed to go back to platform 102.

As one example, suppose that a review request message with a compressed link is sent to a mobile device. If the message is opened on an Apple device running the iOS mobile operating system, the Safari browser is caused to be opened on the device when the link is clicked. Similarly, if the message is opened on an Android device, clicking of the compressed link causes the Google Chrome browser to open. Any other mobile browser can be caused to open on the devices (e.g., default set browser or browser selected from a number of browsers installed on the device).

In the opened browser, the link in the review request message, if compressed, is expanded. The expanded URL includes an address of platform 102 as well as the unique user-location key encoded in the sent link.

Continuing with the example shortened URL described above, where the compressed link included in the review request message is: https://goo.gl/3y9WEM, upon expansion, the compressed link is expanded to its original form:

https://surveys.reputation.com/feedback/survey?key=b55114e761b&sid=SURVEY&uuid=b568bf60-aaa8-4105-9be4-aa31e29a9fa2&r=h&ty=1

In response to receiving the indication that the end user is willing to write a review for a location, the information encoded in the link used to contact platform 102 is extracted, including the unique user-location key. Other information encoded in the URL can also be obtained, such as drip level, which will be described in further detail below. Platform 102 is then configured to select a review site on which the end user should write a review for the location, for example, using review site selection engine 214, which will be described in further detail below.

In some embodiments, a reminder review request message can be sent to the end user if platform 102 does not receive an indication that the link in the previous email was clicked.

As one example, when a review request message associated with a particular user-location key is sent, the time or date at which the message was sent by platform 102 (e.g., using a time or date stamp) is recorded for the user-location key in records 212, as described above. In some embodiments, an amount of time that has elapsed since the message has been sent can be determined by accessing the record (e.g., by determining the difference between the transmission time and the current time), which can be used to determine whether a follow up message should be sent. For example, for any messages for which a response has not been received (e.g., platform 102 has not received an indication that an end user has clicked on the link embedded within the message that directs the contacted device to platform 102) within a threshold period of time (e.g., five days or any other appropriate threshold period of time), a follow up or reminder message can be sent by platform 102. In some embodiments, the records in records 212 are periodically (e.g., daily) checked to identify any open review requests that have not yet received a user response (i.e., clicking on a link embedded in a previously sent review request message). In some embodiments, the follow up or reminder messages are sent as part of a drip campaign.

The reminder message can include text that is different from the previous review request message that was sent. A reminder message template can be used to generate the reminder message. For example, the reminder message can have the text "Hey, don't forget to write a review for {location_name}" or "Just a reminder, can you please take a moment to write a review for {location_name}." The reminder message can also include a URL, as described above, that points back to platform 102 (and thereby indicates to platform 102 that a user has elected or accepted the request to write a review for a business location). In some embodiments, the URL in the follow up message is encoded again with the unique user-location key described above, as well as with drip level information. The drip level information indicates the number of reminders that have been sent. For example, the URL can include a drip level that indicates that the user did not click on the link in the first message (e.g., within some threshold period of time), and that this is the second message that is being sent.

The drip logic can be configured (e.g., via review request configuration engine 210). For example, the user can specify the threshold period of time after which a follow up reminder message should be sent, the text of the reminder message, etc.

In response to detecting that a user is willing to write a review for a location, review site selection engine 214 is configured to select a review site on which a user should be directed to write the review for the location.

For example, when the user opens the (reminder) review request message on their device and clicks on the link embedded in the URL, platform 102 is contacted by the user's device. Platform 102, when contacted by the end user device using the link, causes one or more scripts (e.g., a Javascript used to implement review site selection engine 214) to run or execute. In some embodiments, the scripts are run over the browser, with instructions such as redirects sent to the browser. In some embodiments, review site selection engine 214 is configured to decode the location key, user id, drip level, etc. Other information can be obtained from the end user device as well, such as browser-type information. For example, platform 102 can obtain information indicating the type of browser used to open the link (e.g., mobile or desktop), the name of the browser used to open the link (e.g., Safari, Chrome, Opera, Firefox, Internet Explorer, etc.), user agent, etc. Device type information, such as device type, operating system, etc. can also be obtained.

The business location information (e.g., location key) decoded from the URL used to direct the end user mobile device to platform 102 is used to obtain the URLs of profile pages of the business location on various review sites. For example, the decoded location key is used to access location data store 220. Location data store 220 includes data or information for business locations, such as attribute values for attributes such as name, address, phone number, website URL, etc. of various business locations. The information stored for a location also includes the URLs to the profile pages of the location on various sources (e.g., Yelp profile page, Google+ profile page, Facebook profile page, etc.). The URLs can be provided to platform 102 manually (e.g., by a representative of the business location), or automatically identified by the platform (e.g., searched for by platform 102 using known attribute values of the business location).

Review site selection engine 214 is configured to select a review site URL from the obtained profile page URLs to which an end user should be directed to write their review of a business location. In some embodiments, which of the available obtained URLs should be considered as candidates for the selection is configurable (e.g., via review request configuration engine 210). For example, a business location may have profile pages on fifty different review sites. A representative of a business location can specify a subset of the total URLs as the pool of candidate URLs from which the selection should be made. For example, a representative of the business location can select specific review sites that they would like platform 102 to direct potential reviewers to (e.g., a specific five review sites out of the fifty review sites on which the business location has a profile).

In the example shown, performing the review site selection includes prioritizing the candidate review sites (profile page URLs) using prioritization engine 216. Review site prioritization engine 216 is configured to prioritize or rank the candidate review sites. In some embodiments, the prioritization is based on ranking the review sites according to a need of the business location to have additional reviews on the review sites. For example, if it is determined that the business location has a sufficient number of reviews on Facebook, but not on Yelp, then the location's Yelp URL will be prioritized ahead of the location's Facebook profile URL. In some embodiments, websites are prioritized using reputation scoring and review distributions, which will be described in further detail below.

In some embodiments, prioritization engine 216 is configured to determine, for each candidate review site, a benefit that a given business location would derive from having additional reviews on a given candidate review site. In some embodiments, the benefit to the business location that would be gained from having additional reviews on a given review site is determined by determining how a business location's reputation score would change (whether positively or negatively) based on stimulating the addition of new reviews on the given review site. The review site that would yield the highest positive change in its reputation score if additional reviews were added to the review site is prioritized first.

In some embodiments, simulations of additional reviews on each of the identified review sites in the list are run, and corresponding modeled reputation scores are generated (e.g., using techniques described in "Example Score Generation" below). The review sites in the list are prioritized according to or based at least in part on the generated modeled reputation scores (e.g., highest modeled reputation score is ranked highest, second highest modeled reputation score is ranked second highest, and so on). In some embodiments, the modeled reputation score generated for a simulation of additional reviews on a given review site is a factor in a variety of factors used to weight the given review site when prioritizing review sites.

In some embodiments, the prioritization is based at least in part on an evaluation of the number of reviews that the business location has on each of its profile pages on the various review sites being prioritized. The evaluation can include comparing business location reviews against a quota or threshold. The comparison can be used to determine a need for the business location to have additional reviews on a given review site in the pool of candidate review sites. The candidate review sites are ranked or prioritized according to the need. In some embodiments, the quota or thresholds are determined according to industry review benchmarks and review distributions, as will be described in further detail below.

For example, suppose that this month, Acme Dentistry received five Google+reviews and five Yelp reviews. For both Google+ and Yelp, Acme Dentistry has reached their quota for a search engine optimization (SEO) value for the dentistry industry (e.g., according to review distributions and industry review benchmarks), and thus, Acme Dentistry is determined to have sufficient reviews on Google+ and Yelp. Acme Dentistry therefore does not need additional reviews on Google+ and Yelp. Instead, other review sites that do not have sufficient reviews (e.g., have not met the quota) should be prioritized ahead of Google+ and Yelp.

In some embodiments, candidate review sites are prioritized according to a difference between a number of reviews on a given review site and a quota or threshold. The review site that is the furthest below the threshold is prioritized highest, while those review sites that meet or exceed the threshold are prioritized lowest.

In some embodiments, prioritization engine 216 is configured to determine, for each candidate review site or source, a number of reviews that have been generated for a given candidate review site or a previous period or window of time (e.g., last thirty days). The candidate review sites are then prioritized, as described above, based on a comparison of their respective numbers of reviews to a quota or benchmark for the same period of time.

Thus, placement of reviews for a business location can be targeted or prioritized. Further details regarding targeting and prioritization of review placement will be described below. Further details regarding reputation scoring will also be described below.

In some embodiments, prioritization is based on other information or criteria. For example, information associated with an end user device that has been contacted can be used to prioritize review sites. As described above, when contacted by an end user device, platform 102 can obtain device information, such as the device type or operating system of the end user device. Such device information can be used to further prioritize review sites.

For example, if the end user device is determined to be running the Android operating system, then additional weight can be given to the Google+ source, as users of devices running the Android operating system are often required to have Google (and by extension, Google+) accounts.

The end user device information can also be coupled with analytics information to determine whether to apply additional weight to certain review sources. For example, suppose that based on past analytics, it is determined that Android users provide a better yield of reviews if directed to Google+, while a better review yield is obtained on Facebook for iOS users. Based on this analytics information, the Google+ review site can be given additional weight for Android users, while Facebook can be given additional weight for iOS users.

In some embodiments, the operating system or mobile ecosystem/platform of an end user mobile device can be inferred. As one example, the mobile ecosystem or operating system of an end user's device can be inferred from information about the browser that was used to contact platform 102. For example, if the contacting browser is the Safari browser, then it is likely that the mobile device being used is an Apple device running the iOS browser. If the browser being used is Chrome, then the end user device is more likely to be an Android device. In some embodiments, a user agent header can be used to identify a device (e.g., operating system, software vendor, etc.).

Thus, additional weight (potentially leading to increases or decreases in priority) can be given to a review site based on device type, operating system, browser, or any other type of information associated with an end user device, as appropriate.

In some embodiments, a prioritized list of review sites is generated and returned as output by review site prioritization engine 216. The outputted list includes a prioritized list of URLs to profile pages of a business location on various review sources or sites. As described above, the URLs are ranked according to a determined need of, or benefit to, the business location having additional reviews on the various corresponding review sources. The prioritization can also be weighted based on other factors such as obtained end user device information.

As described above, review site selection is performed in response to a potential reviewer agreeing to write a review (where a new instance of the review selection process is executed for each new review request acceptance). This includes determining the prioritization of review sites dynamically, at the time that a prospective user has indicated that they are willing to write a review. Performing review site prioritization on demand, at the time that a user agrees to write a review, ensures that the reviewer is provided the freshest, most up-to-date review site prioritization, regardless of the amount of time between the transmission of a review request message and when the user clicks on the link, which may be long after the review request message was sent. For example, if an SMS review request message were sent out while a potential reviewer was on an international flight, it may be several hours until the user is able to view the review request message.

In some embodiments, the prioritized list generated by review site prioritization engine 216 is also pruned, using pruning engine 218. Pruning the prioritized list includes removing profile page URLs from the prioritized list. In some embodiments, pruning is performed prior to or concurrently with prioritization. The pruning can be based on a variety of factors and criteria, which will be described in further detail below.

In some embodiments, pruning is performed based on historical information associated with the combination of user (identified by user id) and location (identified by location key).

For example, for a given combination of user and location (e.g., identified using user-location key hash), a record of what review site URLs have previously been sent to the user is obtained (e.g., from records 212), as well as timestamp information indicating when those URLs were sent.

If a user has already been sent a URL in the prioritized list previously, for example, within a window of time (e.g., thirty days), then the URL is pruned from the prioritized list. For example, if Richard had been sent to Acme Dentistry's Google+ profile to write a review within the last thirty days, then the URL to Acme Dentistry's Google+ profile would be removed from the prioritized list. If more than thirty days has elapsed or expired, then the Google+ URL will not be pruned out. Any appropriate threshold amount of time (e.g., two weeks, fifteen days, etc.) can be used when performing pruning.

In some embodiments, pruning is determined based on how the end user device will be redirected to a URL on the prioritized list. For example, as will be described in further detail below, if platform 102 determines that an end user device is a mobile device (e.g., based on a mobile browser identifier or some other identifier of a mobile device), platform 102 can attempt to redirect (using redirection engine 222) the browser of the contacting end user device to a business location's profile page on an app installed on the end user mobile device that corresponds to a given review source. For example, platform 102 can attempt to cause the Yelp app to open on Richard's phone to Acme Dentistry's Yelp profile page. Platform 102 can also redirect an end user mobile device to a profile page of the business location on a mobile optimized website for a given resource. For example, platform 102 can attempt to cause the browser on Richard's phone to redirect to Acme Dentistry's Yelp profile page on the Yelp website (which may have a mobile optimized version). The prioritized list of review sites can be pruned of URLs for review sources that do not have mobile apps for the ecosystem of the end user mobile device or that do not have mobile optimized websites.

For example, as described above, the operating system or ecosystem (e.g., Android, iOS, Windows 10 mobile, etc.) of the end user mobile device can be obtained by platform 102 when it is contacted by the end user mobile device. For a review source associated with a given URL in the prioritized list, pruning engine 218 will prune out the URL if the review source does not support a mobile app on the mobile ecosystem. The URL will also be pruned out if a mobile app for a review source does exist for the mobile ecosystem, but does not support the writing of reviews. In some embodiments, a list of sources and flags indicating whether the sources have apps on various ecosystems is maintained and stored by platform 102. This mapping of mobile ecosystems and available apps can be used to determine whether to prune out URLs from the prioritized list.

If an end user mobile device is to be redirected to a review site's website to leave a review for a location, platform 102 can prune out those URLs to profile pages on review sites that do not provide a mobile optimized website. For example, URLs for review sources in the prioritized list that do not have mobile optimized websites or mobile browser experiences on which reviews can be submitted are pruned from the prioritized list. In some embodiments, a lookup of a list of review sources that includes binary flags indicating whether review sources are review-requestable or writable on the mobile web is performed to determine whether a URL for a review source should be pruned or removed from the prioritized list.

In some embodiments, if a browser of an end user device is determined to be a desktop browser (not a mobile browser), then the desktop version of a profile page of a location on a review source's website will be sent.

The prioritized (and pruned) list of URLs that is generated by review site selection engine 214 is then passed to redirection engine 222. Redirection engine 222 is configured to redirect an end user (mobile) device to the page profile of the business location on a particular review site so that the end user can leave a review for the business location.

For example, after a user clicks on a link in a review request message sent to their mobile device, causing a mobile browser to be opened and directed to platform 102, a prioritized list of URLs for profile pages of a business location on various sources is dynamically determined, as described above. In some embodiments, redirection engine 222 of platform 102 is configured to redirect (e.g., using the Hypertext Transfer Protocol (HTTP) 302 redirect mechanism) to the first URL on the prioritized (and pruned) list. If opening of the first URL is not successful, then the next URL in the prioritized list is sent (i.e., URLs in the prioritized list are sent sequentially based on or according to the identified priority). If none of the URLs in the prioritized list could be opened on the end user mobile device, then other fallbacks can be attempted. For example, if app launch attempts are unsuccessful, attempts to open mobile optimized versions of the websites for the review sites can be made (according to the previously determined priority), and vice versa. In some embodiments, as a final fallback, a profile page for the location on a mobile-optimized website provided by platform 102 can be sent to the end user mobile device.

As described above, the manner in which the URLs are sent by redirection engine 222 (and an end user device browser redirected) can vary. For example, if the browser used to contact platform 102 is identified as a desktop browser (using information obtained during the contact by the browser), then the URLs for desktop versions of a location's profile pages are sent to the end user device.

If it is determined that the end user device is a mobile device (e.g., smartphone, tablet, etc.), redirection engine 222 can attempt to cause the end user mobile device to open the location's profile page in a mobile application (app) that may be installed on the mobile device. Redirection engine 222 can also attempt to cause the end user mobile device to visit a location's profile on a mobile optimized website for a source.

As will be described in further detail below, depending on how an end user mobile device is to be redirected (e.g., either to a mobile app or a mobile optimized website), different processing is performed by redirection engine 222.

In some embodiments, opening of apps and opening of mobile optimized websites are fallbacks for one another. For example, redirection engine 222 can attempt to open apps for various sources in the prioritized list first. If none of the app opening attempts are successful, then attempts are made to direct the end user mobile device to mobile optimized websites to leave reviews. The ordering of attempts can also be reversed. For example, mobile optimized websites can be attempted first, and then app opening attempts can be attempted as a fallback.

In some embodiments, pruning of a prioritized list of URLs, as described above, is performed based on the type of attempt (websites versus apps) being performed. For example, in some embodiments, while the review source profile page URLs will be prioritized the same way regardless of whether mobile or app attempts are being made, the overall prioritized list may be pruned differently depending on whether review sources have appropriate apps and/or mobile optimized experiences.

In some embodiments, pruning is performed when an attempt at a particular type of redirection is made. When a fallback to another redirection type is performed, the overall prioritized list is obtained and is re-pruned based on appropriate criteria. For example, if app attempts are to be made first, then the overall prioritized list of URLs is pruned based on criteria appropriate to apps (e.g., whether a review source has a mobile app for a given ecosystem), as described above. If none of the apps launched successfully, then the mobile optimized web sites can be attempted. When mobile optimized websites are attempted, the overall prioritized list (unpruned) is re-pruned according to the mobile website criteria (e.g., whether a review source has a mobile optimized experience on the web), forming a new list of URLs.

In some embodiments, app and mobile website attempts can be interleaved. For example, suppose that the first URL in the prioritized list is for Acme Dentistry's profile on Yelp. Suppose that app attempts are attempted first, and mobile websites are attempted as a fallback. Platform 102 can first attempt to open the Yelp app on Richard's smartphone (which may or may not be installed) to Acme Dentistry's profile. If opening of the Yelp app is not successful, platform 102 can attempt to redirect Richard's device to Yelp's mobile optimized website (if one exists) to leave a review for Acme Dentistry. If opening of the Yelp mobile website is also unsuccessful, platform 102 then goes to the next review source on the prioritized list, and again attempts the app for the review source and then the mobile website for the review source (or vice versa) before moving to the next review source on the list.

In some embodiments, if app and website attempts are interleaved, pruning of an overall prioritized list of URLs can be used to generate a single list that includes, for each review site profile page of the location, a URL for the review site's app (if available) and a URL for the review site's mobile website (if available). The review sites can still be pruned based on historical information (whether a user has already been sent to a profile page of the location on a given source), irrespective of whether app or mobile optimized website launches are to be attempted.

In some embodiments, a final fallback (e.g., if none of app and website attempts were successful) can be provided, which can include a mobile optimized website provided or operated by platform 102, and on which a user can leave a review for a location. For example, an end user device will be directed to a testimonial page associated with platform 102 on which a reviewer can leave a review for the location. In some embodiments, customers of platform 102 will still be provided search engine optimization (SEO) benefits for their business location for reviews left on the mobile optimized website associated with platform 102.

In some embodiments, prioritization of the attempts to open apps and mobile optimized websites, as well as fallbacks, is user configurable (e.g., via review request configuration engine 210).

Further details regarding processing performed in redirection to mobile apps and/or mobile websites, such as formatting of URLs that are sent by platform 102 and determination of whether to move to a next URL in a prioritized list are described below.

Opening Apps

If an attempt is made to open a mobile app of a review site to the profile page of a location, a URI sent to a mobile device is formatted or constructed in a manner that will cause the browser of the mobile device (which is awaiting a response from platform 102) to attempt to open the mobile app for the review site.

As one example, suppose that the link to the first profile page for Acme Dentistry in the prioritized list dynamically generated for Richard is for Acme Dentistry's Google+ page. In order to cause Richard's device to attempt to open the Yelp app to Acme Dentistry's profile page, redirection engine 222 sends the following example resource link or URI (Uniform Resource Identifier):

yelp://<Acme Dentistry business id>

As shown in this example, rather than starting with "http://", the URI sent to Richard's device begins with a name of the app for which a launch attempt is being made, and is structured in a manner that is interpretable to web browsers such that when Richard's device receives this URI, it will attempt to open the Yelp app (whose name is specified in the sent URI) on Richard's device to Acme Dentistry's profile page (indicated by the business identifier included in the sent URI). Thus, by sending a URI in such a format, mobile browsers will attempt to launch a particular app rather than continuing to a website in the browser.

The app of interest that platform 102 is attempting to open on an end user device may or may not be installed on the device. If the app was not successfully opened on the device, platform 102 will send the next review source profile page in the prioritized list.

As one example, redirection engine 222 determines whether an app was successfully or unsuccessfully opened as follows. Typically, if an app is installed on a device, it will launch or open immediately after the browser is redirected using a URI that is formatted, for example, in the manner described above (although it may take additional time for the location's profile page to load in the launched app, depending on the device's network connectivity).

If the app is not installed, then the end user device's (mobile) browser will return an error message or callback to platform 102. Redirection engine 222 obtains the indication that the app could not be opened, and then sends the next review source URL in the prioritized list.

As one example of callback and then fallback, suppose that platform 102 attempts to launch the Facebook app and go to the page of Watt Motors of San Diego. If the app is not launched for Watt Motors for Facebook, assuming the next URL in the prioritized list is Yelp, then platform 102 will launch the Yelp app using the example url: yelp://biz/watt-motors-san-diego.

If the app for the review source is installed on the device, then it will launch immediately, and no error message or callback will be returned. In some embodiments, if redirection engine 222 receives no error feedback or callback from the end user device within a certain amount of time (also referred to herein as a "timeout" period), then platform 102 determines that the app was installed on the device and has launched. The timeout period can be adjustable.

Thus, if redirection engine 222 does not receive an indication of an error with opening an app within a timeout period (e.g., five seconds), then it is determined or assumed that the app was successfully opened on the contacted device.

If none of the apps for the review sources in a prioritized list were successfully opened, then redirection engine 222 determines that none of the apps in the prioritized list were installed on the contacted device, and a fallback option can be initiated. For example mobile optimized websites can be attempted or the contacted device can be redirected to a mobile optimized review website for the location associated with platform 102.

For example, suppose that platform 102 is attempting to launch the Facebook app and go to the page of Watt Motors of San Diego. If the app is not found on the device, and Facebook is the only review site on the prioritized list, then a callback is received by platform 102, and platform 102 automatically redirects the user to https://www.facebook.com/WattMotors (e.g., interleaving of app and mobile optimized website launch attempts.

Opening Mobile Optimized Websites

As described above, some review sites may allow reviewers to write reviews over a mobile browser (while some review sites may not permit this). For example, some review sites may provide a mobile-optimized web experience through a browser (e.g., user interface that is optimized for use on mobile device screens).

Redirection engine 222 will attempt to send the first URL in a prioritized list that is to a location profile page on a review source that has a mobile optimized experience (where those pages that are on sources that do not have a mobile optimized experience are pruned out, as described above).

In some embodiments, as with mobile apps, redirection engine 222 can determine whether redirection of a mobile device to a review site website was successful based on whether a callback was returned by the device. For example, if a sent webpage renders successfully in a browser, then no callback will be made to platform 102 from the browser of the mobile device. If no callback is received by platform 102 within a timeout period (e.g., five seconds), then platform 102 determines that the sent webpage rendered successfully. The time period can be adjustable.

If a callback (e.g., error message) is received by platform 102 within the timeout period, then the sent page could not be rendered in the device's browser, and redirection engine sends the next page in the prioritized (and pruned) list.

In some embodiments, successful redirection (of either apps or websites) is recorded to records 212. For example, the name of the review site and/or URL/URI of the successful redirection (along with time and date stamps of when the successful review site URL was sent) is stored to the record for the corresponding combination of user identifier and location key. An indication of whether an app or mobile optimized website launch was successful can also be recorded.

In some embodiments, analytics regarding review requesting can be recorded and/or computed or calculated, for example, using analytics engine 224. As described above, various data associated with review requesting can be collected, such as the type (e.g., SMS or email) of review request messages that were sent to users, when users clicked on links embedded in the review request messages (acknowledging a request to write a review for a location), the links (to apps and/or websites) that were successfully launched on devices, etc. Device information associated with users (e.g., mobile ecosystem, device type, etc.) can also be recorded. The collected information is associated with particular locations and users (using user-location key combination or hash).

The recorded information can be used to determine various statistics about review requesting. For example, the most popular app that is installed on devices can be determined based on what apps were determined to have successfully launched.

The review requesting information can also be correlated or analyzed with other information collected by platform 102. For example, platform 102 can also be configured to obtain and analyze reviews for a location from various sources. The reputation of a location can be determined based on the collected reviews (e.g., using reputation scoring, which will be described in further detail below). The review information can be correlated with review requesting information to determine an impact of review requesting on the reviews that are left. For example, the apps that have a better return rate with respect to the leaving or writing of reviews can be determined. As one example, an increase in the volume of reviews can be correlated to changes in how review requests are made (e.g., based on timestamp information recorded for reviews that are left and for review request messages that are sent). Segmenting of reviewers can further be performed based, for example, on the device information (e.g., device type, operating system, etc.) obtained from end user devices of potential reviewers.

Such analytics information can be passed on to tenants of platform 102 to better understand how the tenants of platform 102 can engage with their own customers. Platform 102 can also use the information to provide recommendations to tenants, for example, suggesting certain apps or review sites that are likely to generate or yield more reviews.

The analytics information can be fed back to the review requesting process. For example, the information can be used to configure whether SMS review request messages or mobile-email review request messages should be sent. In some embodiments, the analytics information is fed back to the logic for selecting review sites. For example, when prioritizing review sites, a review site can be given additional weight if, based on analytics, it is determined that certain review sites are likely to generate or yield more reviews for certain segments of users (e.g., identified by device type).

Thus, platform 102 can aggregate information on the number of reviews that are being written and collected, which can be matched up or otherwise correlated with the information observed by platform 102 about the review requesting process.

Figure 3A:
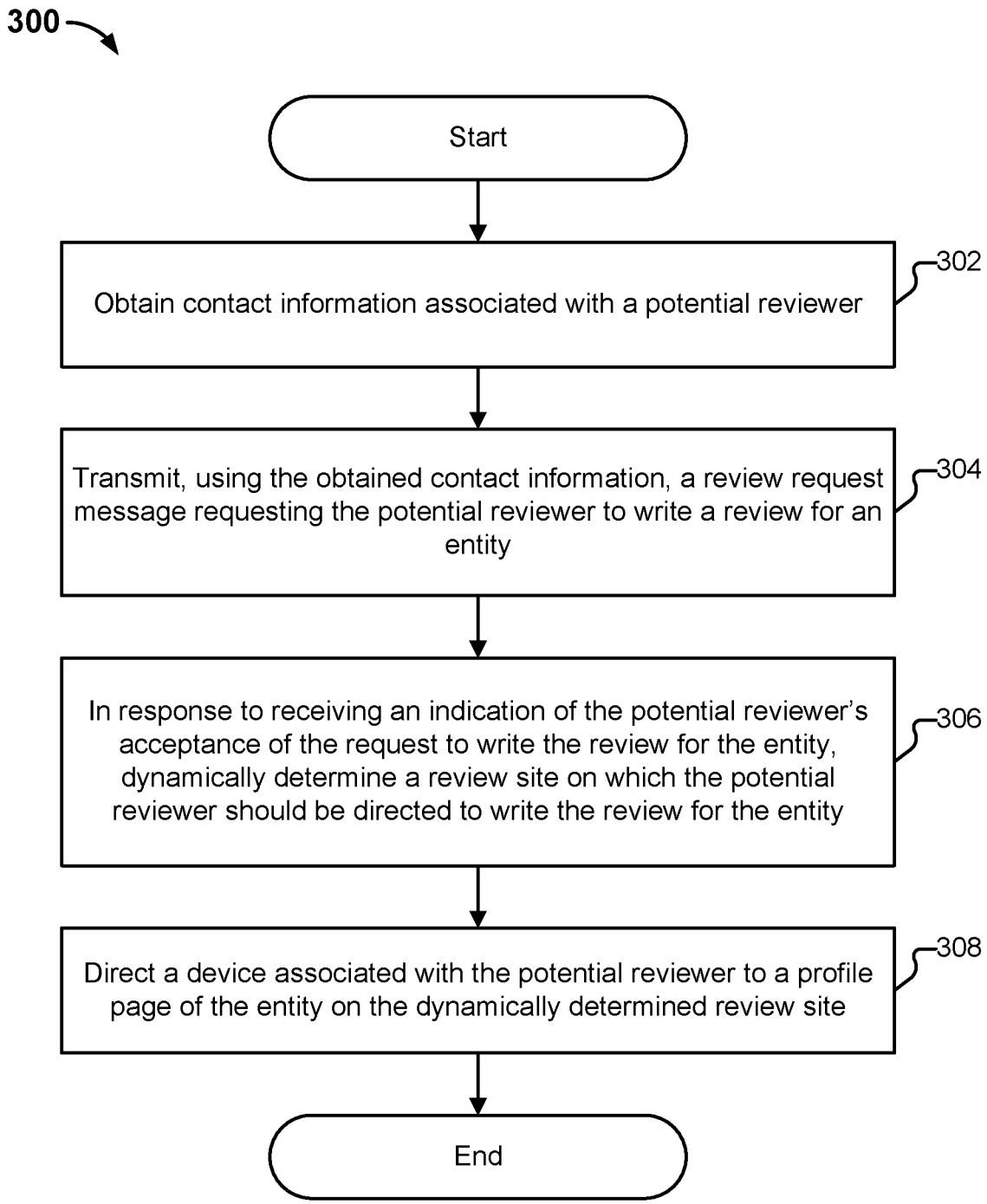
FIG. 3A is a flow diagram illustrating an embodiment of a process for requesting reviews.

FIG. 3A is a flow diagram illustrating an embodiment of a process for requesting reviews. In some embodiments, process 300 is executed by platform 102. The process begins at 302 when contact information associated with a potential reviewer is obtained. For example, the contact information of a customer of an entity such as a business location is obtained. The contact information can be obtained from the business location. As one example, the contact information is obtained from a customer relationship management (CRM) system used by the business location.

In various embodiments, the contact information includes a phone number, an email address, or any other appropriate type of contact information associated with the potential reviewer. The contact information can be obtained along with information associated with a customer interaction involving the potential reviewer and the business location. For example, details regarding the products and/or services that were provided by the business location to the end customer/potential reviewer are obtained (e.g., what particular product and/or service was provided, the date on which the product and/or service was provided, etc.). Additional information associated with the potential reviewer, such as the name of the potential reviewer, can also be obtained.

In some embodiments, a location key that uniquely identifies the business location is also obtained along with the contact information.

In some embodiments, the user contact information (e.g., phone number and/or email address) is combined with a location key for a business location to generate a unique user-location key (e.g., that is a hash of the contact information and the business location key).

At 304, a review request message is transmitted to the potential reviewer using the contact information obtained at 302. In some embodiments, the review request message includes text requesting or inviting the potential reviewer to write a review for the business location.

In some embodiments, the review request message is sent as an SMS (short message service) text. The review request message can also be sent as an email. The review request message is sent to the potential reviewer using the contact information obtained at 302.

In some embodiments, the review request communication or message sent to the end-user/potential reviewer includes a unique link or URL (Uniform Resource Locator). The unique link, when clicked on by an end-user or potential reviewer, causes a browser to open on the potential reviewer's device that takes the potential reviewer to a site associated, for example, with a reputation platform such as platform 102. In some embodiments, the URL string embedded in the review request message includes the user-location key generated using the obtained contact information and location key obtained at 302.

In some embodiments, the review request message includes an option for the potential reviewer to unsubscribe to communication from a reputation platform (e.g., platform 102) and/or the business location. For example, instructions can be provided in the message that indicate what action(s) (e.g., replying STOP to the SMS review request message) to take to unsubscribe from all communications with the business. If the action is taken, then the potential reviewer or user is unsubscribed from all communications with the business.

In some embodiments, the review request message is generated according to a template. Different templates can be used to generate the review request message depending on the communication channel to be used in delivering or communicating the review request message. For example, different templates can be used to generate the review request message based on whether an SMS or email review request message is to be sent.

The templates can include standard text (e.g., asking the potential reviewer to write a review) to include in the message. In some embodiments, the templates include placeholder variables so that values specific or otherwise pertaining to the potential reviewer, business location, and/or customer interaction involving the potential reviewer and business location can be included in the message (e.g., to personalize the message to the potential reviewer). For example, placeholder variables for including the potential reviewer's name, the name of the location, information about products and/or services provided by the business to the potential reviewer, etc. can be obtained (e.g., at 302) and dynamically inserted into the placeholder variables in the template when generating a review request message.

In some embodiments, a follow up or reminder message is sent at a subsequent time if no indication of the potential reviewer clicking on the embedded link is received. For example, a timestamp can be stored to a record corresponding to the combination of user identifier and location key. If the link in the review request message has not been clicked within a threshold amount or window of time (e.g., thirty days), a follow up message is sent to the potential reviewer again. In some embodiments, the follow up message uses a template for reminder messages that may include different content from the initial message. In some embodiments, the follow up message includes the same link as the initial message, with the same encoded information. In some embodiments, the link in the review request message also has encoded a drip level, which indicates, for example, a number of times that a potential reviewer or end user has already been contacted to write a review for a location.

At 306, in response to receiving an indication of the potential reviewer's acceptance or acknowledgment of the request to write a review for the location entity, a review site on which the potential reviewer should be directed to write the review for the location entity is dynamically determined.

For example, as described above, when the potential reviewer has clicked on the link embedded in the review request message, a web browser of a device associated with the potential reviewer is taken to a site associated with a platform such as platform 102.

Based on the contact from the device associated with the potential reviewer, the link that was embedded in the message transmitted at 304, and which caused a browser on the device to be directed to a platform such as platform 102, is obtained. The user-location key (or separate user identifier and location key/identifier) can be extracted and/or decoded from the link that was selected or activated by the end user. The user identifier of the potential reviewer and the location key for the particular business location can then be identified.

A list of sources (e.g., review sites) on which the location has profile pages is identified. In some embodiments, each source is represented with a link (URL) that points to the profile page of the location on a given source or review site. The list of sources can be configured, for example, by a user specifying the sites on which they wish to obtain reviews. The list of sources can also be automatically obtained. For example, a search for the location's profiles on various review sites can be performed by querying general search engines (e.g., Google, Bing, etc.) or custom specific site searches (e.g., a profile API finder for a site such as Yelp) using attributes (e.g., name, phone number, physical address, etc.) of the location.

In some embodiments, the identified list of sources is prioritized. For example, the identified list of sources is prioritized, as described above, based on a need for additional reviews on a given site, or on a determined benefit if additional reviews were written on a given site.

For example, a need for additional reviews on a given review site can be measured by determining a number of reviews written for the location on the given review site within a previous window of time (e.g., last thirty days). The number of reviews within the time window is compared against a quota or threshold number of reviews. Those review sites that are furthest from the quota or threshold number of reviews are prioritized higher. In some embodiments, the quota or threshold number of reviews is based on a search engine optimization (SEO) target. Those review sites that have sufficient reviews are prioritized lower.

In some embodiments, the quotas or thresholds are based on review distributions (a distribution of reviews for a business across various review sites). For example, the review distribution of the business can be compared against one or more target review distributions to recommend the targeting of additional reviews. Review sites can be prioritized according to how many reviews are needed in order to reach a target distribution. As will be described in further detail below, the target review distributions can be determined according to industry review benchmarks. Further details regarding review distributions and industry review benchmarking will be described below.

The benefit of having additional reviews on a given review site can be determined, for example, by modeling a change in reputation score of the location if additional reviews for the location were added to the given review site. The reputation scores can be generated by simulating the addition of reviews to review sites. In some embodiments, target distributions can be used to model the impact additional reviews would have for a business. Further details regarding reputation scoring and modeling the impact of additional reviews on review sites will be described below. Those review sites for which the addition of reviews would result in the largest improvement in reputation score are prioritized higher. Those reviews for which the addition of reviews would result in smaller (or negative) improvements to the location's reputation score are prioritized lower.

In some embodiments, when prioritizing review sites, weights can be applied to review sources that can impact how they are prioritized. As one example, historical review targeting information and information about a potential reviewer can be used to weight review sites in the list. For example, it can be determined that for a given mobile platform or ecosystem (e.g., iOS, Android, Windows 10 mobile, etc.), a given review site provides a better yield of reviews. If the device associated with the potential reviewer matches to the given mobile platform, then the given review site that provides a better yield of reviews can be given additional weight, potentially increasing its priority in the list.

In some embodiments, the identified list of sources is pruned. The identified list of sources can be pruned based on a variety of criteria.

As one example, the identified list of review sites can be pruned of review sites for which the potential reviewer has already been asked to write a review for the location. For example, if the potential reviewer has already been asked to write a review for the location within a window of time (e.g., last thirty days) on a particular review site, then the particular review site is removed from the identified list. In some embodiments, the determination of whether the potential reviewer has previously been requested to write a review for the location on a given review site is performed by obtaining a record corresponding to the combination of user id for the potential reviewer and location id or key for the business location. The record can include historical information regarding the review sites to which the potential reviewer has previously been directed to write a review for the location, as well as timestamp information of when the direction to the review site was performed.

In some embodiments, the identified list of sources is pruned according to a type of direction that is to be performed. For example, the device can be directed or caused to launch a mobile application corresponding to a review source to a profile page of the location entity. If app launches are to be attempted, then the identified list of sources can be pruned of review sources that do not have corresponding apps for the device. In some embodiments, an ecosystem of the device (e.g., iOS, Android, etc.) is determined from device information obtained when the potential reviewer clicks on the link embedded in the review request message transmitted at 304. For example, the operating system of the device can be obtained based on user agent header information obtained from the device or inferred based on the type of browser used to contact a reputation platform such as platform 102, as described above. A mapping of review sites and apps on a given ecosystem can be used to determine whether a review source has a corresponding app for the determined type of device.

If direction of the potential reviewer to mobile optimized versions of the review sites is to be attempted, then the identified list can be pruned of review site URLs that do not have mobile optimized versions.

Pruning can be performed before or after prioritization. For example, the identified list of URLs can be pruned first, and then prioritized. In other embodiments, the identified list of URLs is prioritized first and then pruned.

In some embodiments, the prioritized (and pruned) list of sources or review sites is provided as output. A review site is selected from the prioritized (and pruned) list. For example, the first review site (highest priority) review site in the prioritized and pruned list of sources is selected as the dynamically determined review site.

At 308, a device associated with the potential reviewer is directed to a profile page of the entity on the dynamically determined review site. For example, the device associated with the potential reviewer is directed to the location's profile page on the first review site in the prioritized and pruned list of sources.

If app launches are to be attempted, in some embodiments, a URI is generated that is in a format such that when the URI is passed to a browser of the end user's device, the browser will attempt to cause the mobile app specified in the URI to be launched on the device and the profile page of the location loaded in the launched app. For example, the URI is generated to include the name of the app for a review site to open and an identifier of the location on the review site, as described above.

If the device is to be directed to open the location's profile page on a mobile optimized version of a review site, then a URL for the location's profile page on the review site is sent back or otherwise communicated to the device, and the browser on the device is redirected to the URL and attempts to render the webpage at the URL in the browser.

Redirection of the device associated with the potential reviewer may or may not be successful. For example, in the case of app launches, the app to be launched may not be installed on the potential reviewer's device. In the case of opening mobile websites, errors such as HTTP 404 (indicating a broken or dead link), 302, 301, etc. may occur.

In some embodiments, in the determination of whether an app launched, mobile website redirection is based on whether a callback or error message is received.

For example, in the case of app launches, an app will typically launch immediately if the app is installed on the end user's (potential reviewer's) device. If the app is not installed, then the device will return an error message such as a callback, indicating that the app could not be launched. If a callback or error message is received within a timeout period (e.g., five seconds), then the app launch is determined to have failed or been unsuccessful. If no error message or callback is received from the device within the timeout period, then launching of the app is determined to have been successful.

Similarly, in the case of redirecting the device to a mobile website, if a webpage is successfully rendered on the device's browser, then no error message or callback from the device will be received from the device. If no error message or callback is received within a timeout period, then redirection of the device to the webpage of the location's profile on the review site is determined to have been successful. If an error message or callback is returned within the callback period, then redirection to the webpage is determined to have been unsuccessful or to have failed.

Thus, in some embodiments, redirection of a device of a potential reviewer to a profile page of a location on a given review site is determined to be successful if no error message or callback is received within a timeout period, and is determined to have failed or been unsuccessful if an error message or callback is received within the timeout period.

If redirection of the device to a review site is determined to have failed, then a fallback action is taken. As one example, if an app launch failed for a given review site, then the app corresponding to the next review site in the identified priority described above is attempted to be launched. If launching of all apps in the prioritized (and pruned) list of review sites fails, then in some embodiments, the opening of mobile optimized webpages for the location on various review sites is attempted based on the previously identified priority. If no mobile webpages could be opened, then a final fallback can be performed, in which the device associated with the potential reviewer is directed, for example, to a mobile optimized webpage that is known to be valid. For example, the browser of the potential reviewer's device can be directed to a profile page of the location on a mobile optimized website operated or hosted by reputation platform 102.

The order in which different types of redirection attempts are made can be configurable. For example, rather than opening of webpages being a fallback for launching of apps, launching of apps can be configured to be a fallback for opening of webpages. In some embodiments, app launches and webpage openings can be interleaved. For example, if the app for a review site could not be launched on the potential reviewer's device, then the webpage of the online review site is caused to be opened (if available). As another example, a final fallback can be specified for the potential reviewer's device to the reputation platform's mobile optimized profile webpage for the location. Attempts at app launches or mobile optimized webpages can be excluded as well. For example, after all app launches fail, platform 102 can immediately fallback to sending the end user to a testimonial page hosted by platform 102 (bypassing attempts at opening the webpages for review sites). Similarly, it can be specified that webpage openings are to be attempted, and that the fallback in the event that none of the webpages for review sites could be opened (or none were available after pruning) is to send the potential reviewer's device to the reputation platform's mobile optimized profile webpage for the location.

In some embodiments, the successful direction of the potential reviewer to a profile page of the location on a review site is recorded (e.g., to the record corresponding to the combination of the user identifier of the potential reviewer and the location key for the business location entity).

In some embodiments, analytics associated with the review request and review placement targeting described above can be determined. Statistics associated with successful app launches or webpage openings, for example, can be correlated with changes in the number of reviews added to certain review sites to determine an impact of directing potential reviewers to those review sites. For example, a determination of which apps (e.g., Google, Facebook, Yelp, etc.) on what types or segments of devices (e.g., iOS, Android, Windows 10 mobile, etc.) yield or lead to more reviews or improvements in the reputation score for the location can be determined. The generated statistics can then be fed back to the review placement targeting described herein. For example, as described above, yield statistics can be used to apply additional weights to review sites when prioritizing an identified list of review sites.

Figure 3B:
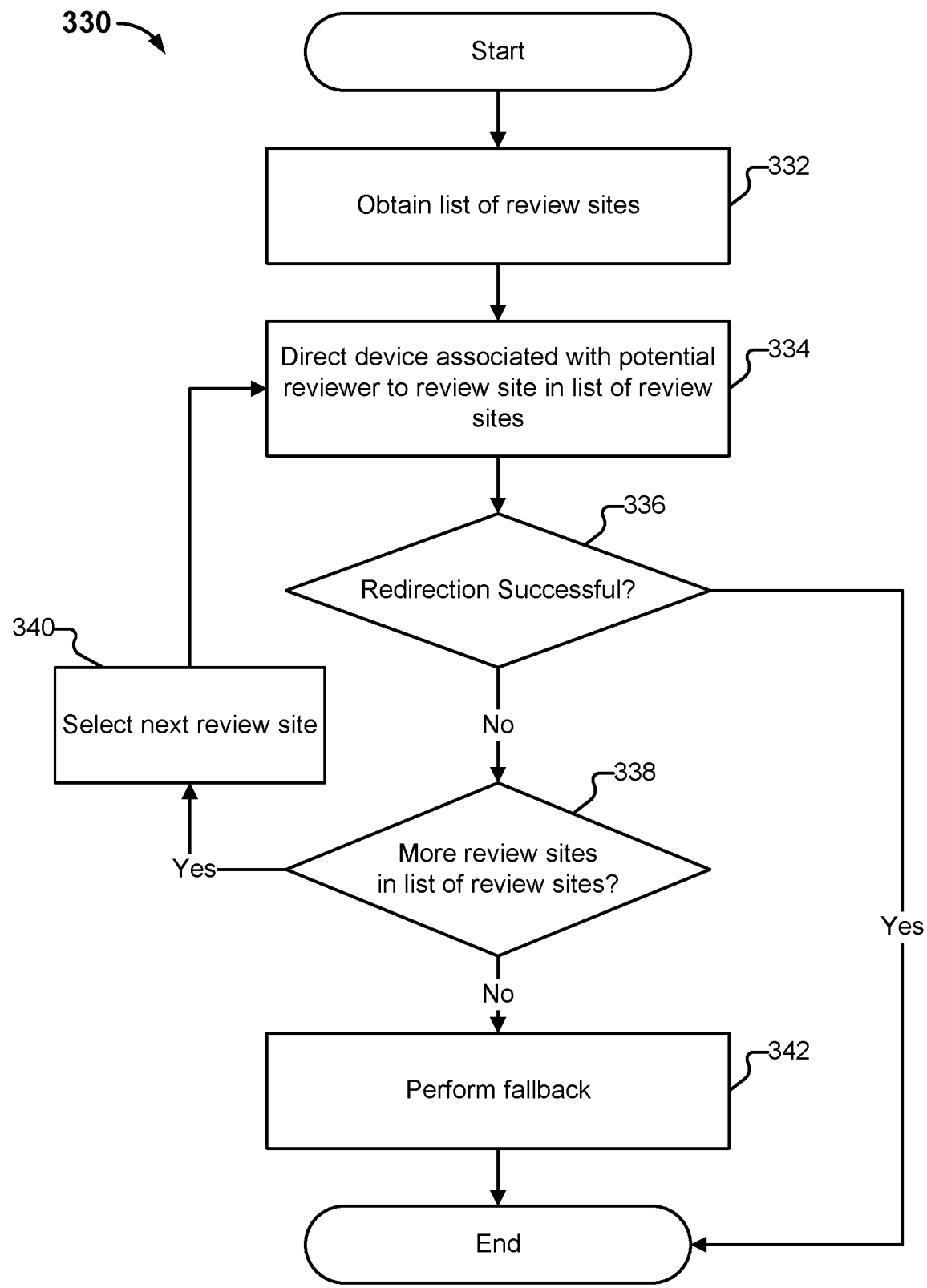
FIG. 3B is a process for directing a device associated with a potential reviewer to a profile of a business.

FIG. 3B is a process for directing a device associated with a potential reviewer to a profile of a business. In some embodiments, process 330 is executed by platform 102. In some embodiments, process 330 is implemented using process steps 306 and 308 of FIG. 3A. Process 330 can be used for launching of apps and/or opening of webpages. The process begins at 332 when a prioritized list of review sites is obtained. For example, a prioritized list of review sites that has been pruned to include corresponding mobile apps or mobile optimized websites is obtained, as described above at step 306 of process 300 of FIG. 3A.

At 334, a device associated with a potential reviewer is directed to a review site in the obtained prioritized list. At 336, it is determined whether direction of the device to the review site was successful (e.g., based on no callback being received, as described above). If direction of the device to the business's profile page on the review site was successful, then the process ends.

If direction of the device to the business's profile page on the review site is determined to be unsuccessful (e.g., based on a callback being received, as described above), then process 330 continues to 338, where it is determined whether there are more review sites to attempt in the obtained prioritized (and pruned) list of review sites. If there are more review sites to attempt in the list, then the process continues to process 340, where the next review site in the list is selected. Process 330 then returns to process step 334, where the device is directed to the business's profile page on the next review site.

If, at 338, it is determined that there are no more review sites in the list of review sites, then process 330 continues to 342, where a fallback is performed. For example, as described above, if all app launch attempts fail (i.e., no more review sites for which corresponding app launches can be attempted), then the fallback can be to attempt the openings of mobile webpages, and process 330 is repeated. As one example, the previously prioritized list of candidate review sites is pruned of review sites that do not have mobile optimized webpages at 332 (e.g., obtaining a new prioritized and pruned list of review sites). The device of the potential reviewer is then directed to open the business's profile on a mobile optimized version of a review site webpage. Similar processing is performed if app launches are attempted as a fallback to opening of mobile optimized webpages (e.g., process 330 is repeated with a prioritized list of review sites that has been pruned of review sites that do not have corresponding mobile apps).

In some embodiments, the fallback action includes directing a device of a potential reviewer to a profile of the business on a webpage hosted by a reputation platform such as platform 102.

Figure 3C:
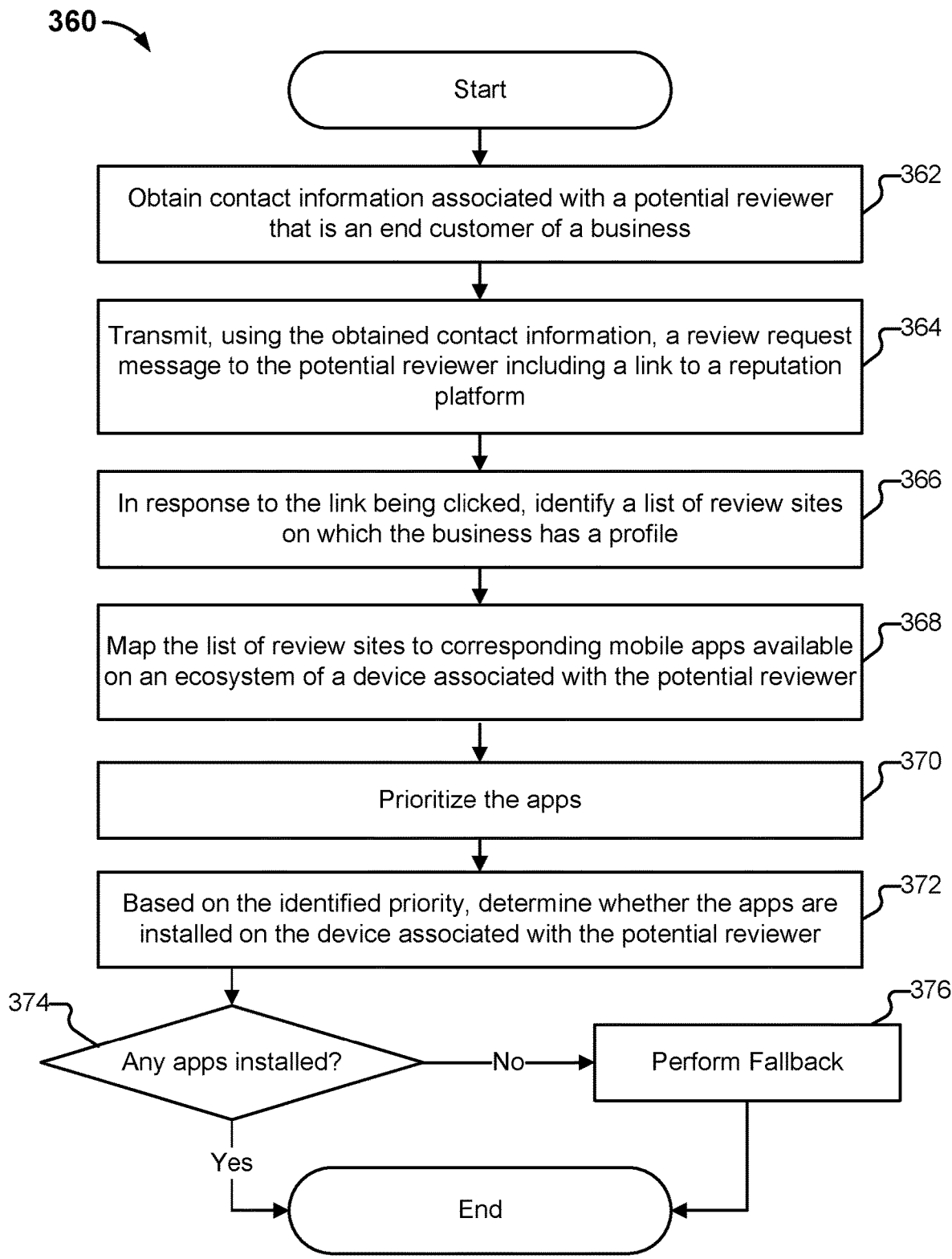
FIG. 3C is a flow diagram illustrating an embodiment of a process for SMS-based review requests.

FIG. 3C is a flow diagram illustrating an embodiment of a process for SMS-based review requests. In some embodiments, process 360 is executed by platform 102. The process begins at 362 when contact information (e.g., the phone number and/or email address) of an end customer (potential reviewer) of a business is obtained. In some embodiments, step 362 is implemented using step 302 of process 300 of FIG. 3A.

At 364, a short message service (SMS) text or an email is sent to a device (e.g., smartphone or tablet) associated with the potential reviewer. The communication or message to the potential reviewer (also referred to herein as "end user") contains a unique link, which as described above, will refer the browser of the potential reviewer's device to a reputation platform such as reputation platform 102.

In some embodiments, the message includes text requesting that the potential reviewer write a review for the business. The message can be generated according to a template, which includes the aforementioned text, as well as placeholder variables for dynamically inserting the potential reviewer's name (obtained at 362), the unique link, the name of the business, etc. An option to unsubscribe to further communication can also be provided. In some embodiments, step 364 is implemented using step 304 of FIG. 3A.

When the potential reviewer opens the message transmitted at 364 and clicks on the link embedded in the message, the browser on the reviewer's device is opened and takes the user to a site associated with a reputation platform.

In response to being contacted by the potential reviewer's device due to the link being clicked on or selected, at 366, logic to cause a profile page for the business to be opened on the potential reviewer's device is executed. In some embodiments, step 366 is implemented using steps 306 and 308 of FIG. 3A.

For example, at 366, a list of review sites that the business has in a system such as platform 102 is identified. At 368, each source in the identified list is mapped to a corresponding mobile app. For example, it is determined whether a source in the list has a corresponding app. The mapping of sources and apps can be performed using information associated with a device of the potential reviewer. For example, when the potential reviewer clicks, on their device (e.g., mobile device such as smartphone, tablet, etc.), the link embedded in the review request message sent at 364, information about the device on which the link was clicked can also be obtained at 366. For example, device information such as operating system (e.g., iOS, Android, etc.), mobile browser type (e.g., Safari, Chrome, etc.), device type, etc. can be obtained by platform 102 when it is contacted by the end user's device.

The device information can be used, for example, to determine an app ecosystem for the potential reviewer (e.g., iOS, Android, etc.). In some embodiments, only sources that have corresponding apps on the determined ecosystem are mapped to their corresponding app. Those sources that do not have corresponding apps on the determined mobile ecosystem are pruned out from the list of review sites.

At 370, the mobile apps are then prioritized using a source selection process. In some embodiments, the source selection process is configured to determine, for each source in the list (that is determined to have a corresponding app), a need for additional reviews on a given source and/or the benefit to the location if additional reviews were added to the given source, as described above.

In some embodiments, the sites for which a location wishes or desires to obtain reviews can be configured (e.g., by a representative of the business). In some embodiments, businesses can also include customized surveys instead of, or in addition to, online review sites.

At 372, based on the priority identified above, it is determined if the mobile apps for the prioritized review sites exist (e.g., are installed) on the potential reviewer's device (e.g., based on whether callbacks are returned, as described above). If it is determined at 374 that an app is installed, it is launched on the potential reviewer's device and caused to take the potential reviewer to the business's profile page on the app. The potential reviewer can then leave a review on the business's profile page using the app. In some embodiments, the apps are attempted to be launched one at a time, according to the determined priority. If an app is determined to be installed, then it is launched, and no further app launch attempts are made, and the process ends.

If at 374 it is determined that no mobile apps for review sites exist on the potential reviewer's device (are not installed on the potential reviewer's device), then a fallback can be performed at 376, where, for example, a webpage of the online review site is caused to be opened based on the previously identified priority.

If no webpages could be opened on the potential reviewer's device (e.g., based on whether callbacks were returned, as described above), then a webpage hosted or operated by the reputation platform can be caused to be opened on the potential reviewer's device as a final fallback option.

As described above, using the techniques described herein, SMS-based review requests can be used to leverage apps on mobile devices such as smartphones with a business's profile page to encourage customers of the business and potential reviewers to leave a review.

Example User Interfaces

FIGS. 4-10 illustrate example embodiments of interfaces associated with SMS-based review requests. In some embodiments, the interfaces are examples of interfaces displayed on a device of an end user or potential reviewer based on processing performed by a reputation platform such as platform 102 (e.g., processes 300, 330, and 360 described above in conjunction with FIGS. 3A, 3B, and 3C, respectively).

Figure 4:
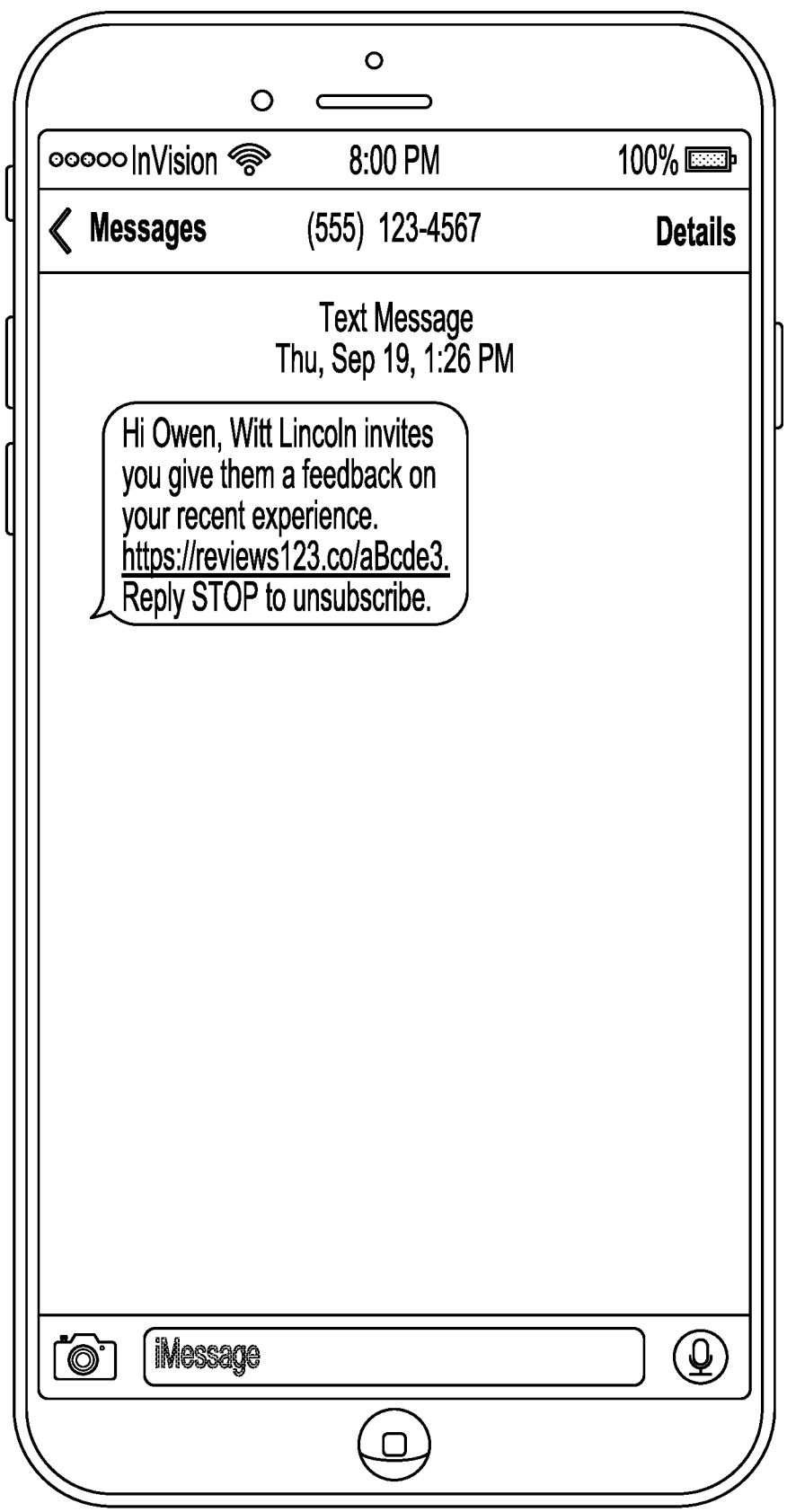
FIG. 4 illustrates an example embodiment of an SMS text message.

FIG. 4 illustrates an example embodiment of an SMS text message. The text message includes a link back to platform 102, as described above. Clicking on the link triggers the review requests and targeted review placement logic described above. In some embodiments, the message is generated using process step 304 of FIG. 3A or process step 364 of FIG. 3C.

Figure 5:
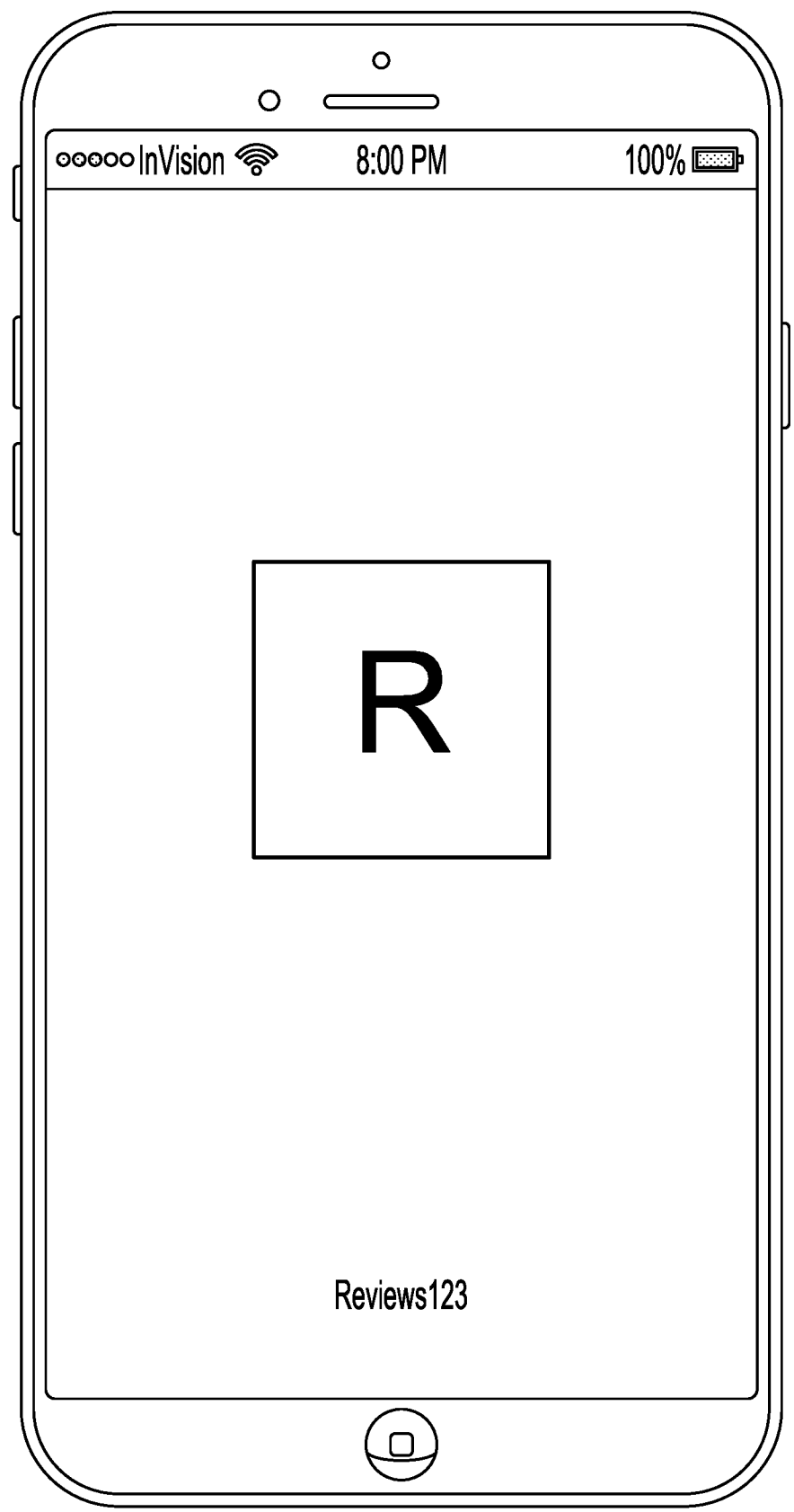
FIG. 5 illustrates an example embodiment of an interface as rendered on an end user device.

FIG. 5 illustrates an example embodiment of an interface as rendered on an end user device. In this example, a screenshot of an example app for a first review site is shown. In some embodiments, the app is opened/launched after the link provided in the SMS shown in FIG. 4 is clicked on by a potential reviewer. For example, after the link is clicked, the end user's device is sent to a reputation platform such as platform 102. Using the processing described above, for example, in conjunction with processes 300, 330, and 360 of FIGS. 3A, 3B, and 3C, respectively, platform 102 is configured to determine a prioritization of review sites and direct the end user device to a profile page of the location on a review site according to the determined priority. For example, platform 102 has returned a link to the mobile browser of the end user's device that is interpretable by the mobile browser and causes the app shown in FIG. 5 to be launched and opened to the profile page of a business location for which a review is being requested.

Figure 6:
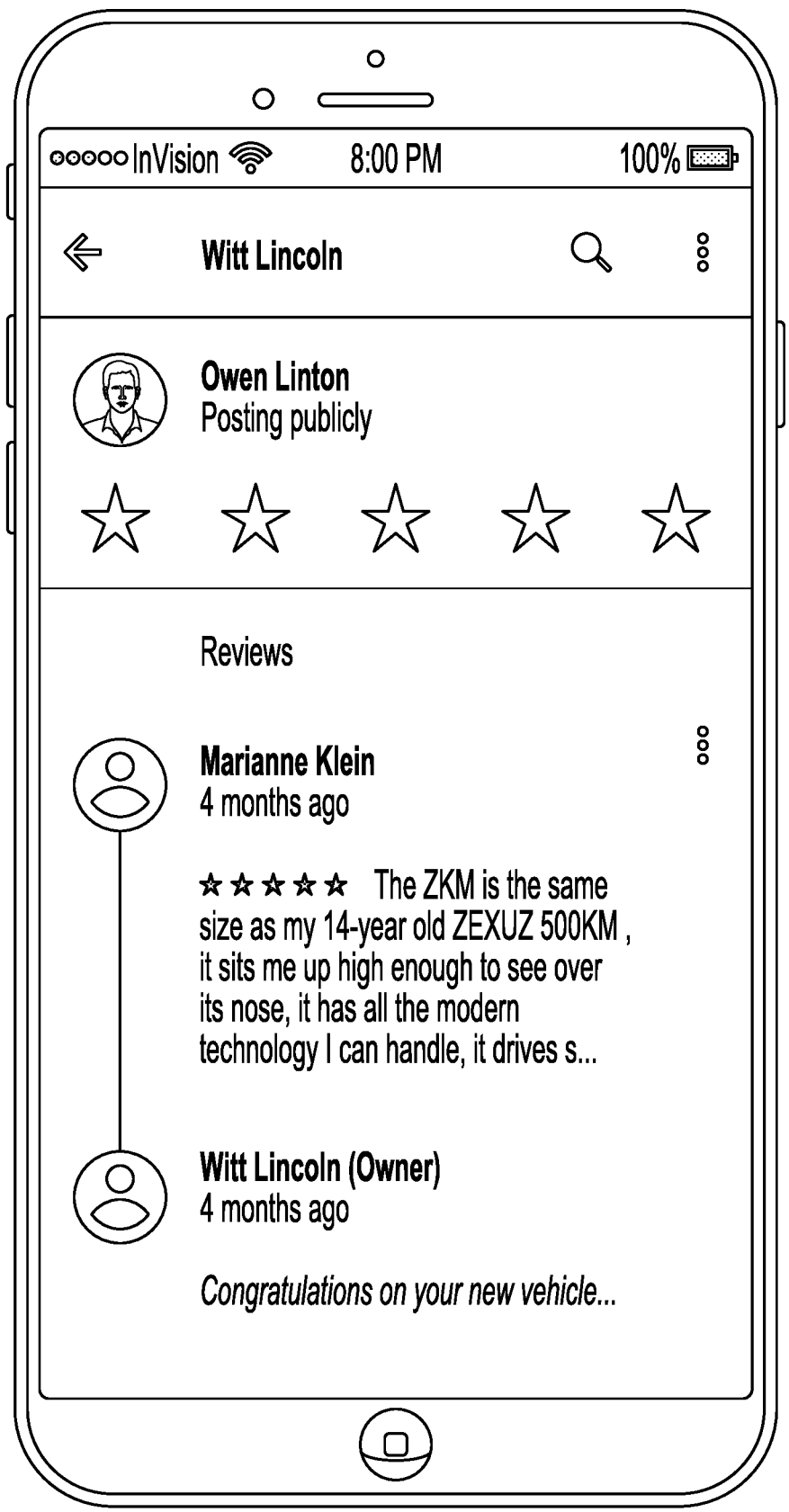
FIG. 6 illustrates an example embodiment of a review.

FIG. 6 illustrates an example embodiment of a review. In some embodiments, the review shown is written in the app shown in FIG. 5.

Figure 7:
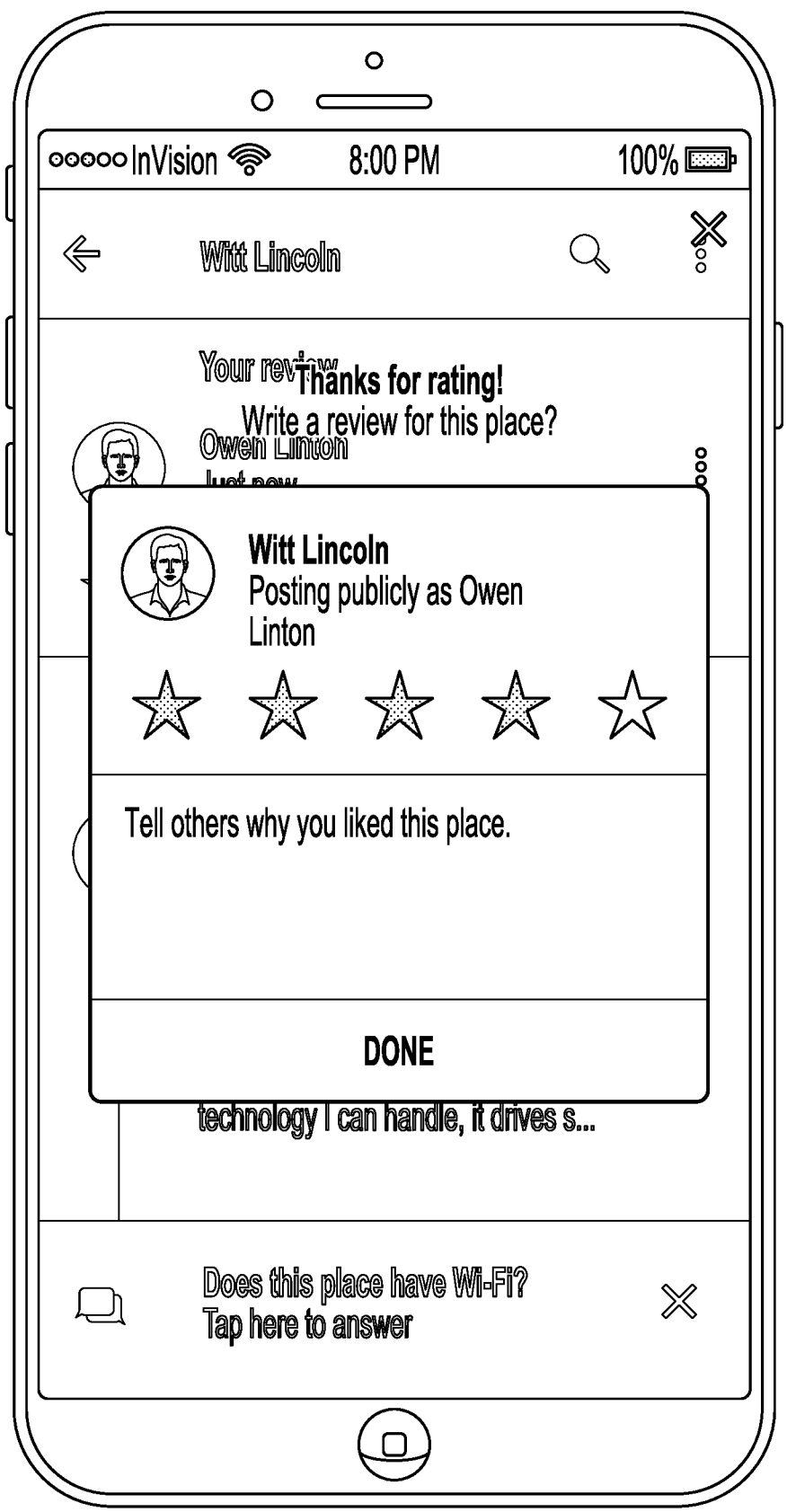
FIG. 7 illustrates an example embodiment of a user interface.

FIG. 7 illustrates an example embodiment of a user interface. In this example, an interface is rendered that thanks the user for writing a review.

Figure 8:
FIG. 8 illustrates an example embodiment of a screenshot.

FIG. 8 illustrates an example embodiment of a screenshot. In this example, a screenshot of an example app for a second review site is shown. In some embodiments, the app is identified and opened/launched using processes 300, 330, and 360 described in conjunction with FIGS. 3A, 3B, and 3C, respectively. For example, an end user device can be directed to the app shown in FIG. 8 if the app shown in FIG. 5 could not be opened (e.g., a callback was returned to platform 102, which selected a next review site in a prioritized list to which to send the end user's device).

Figure 9:
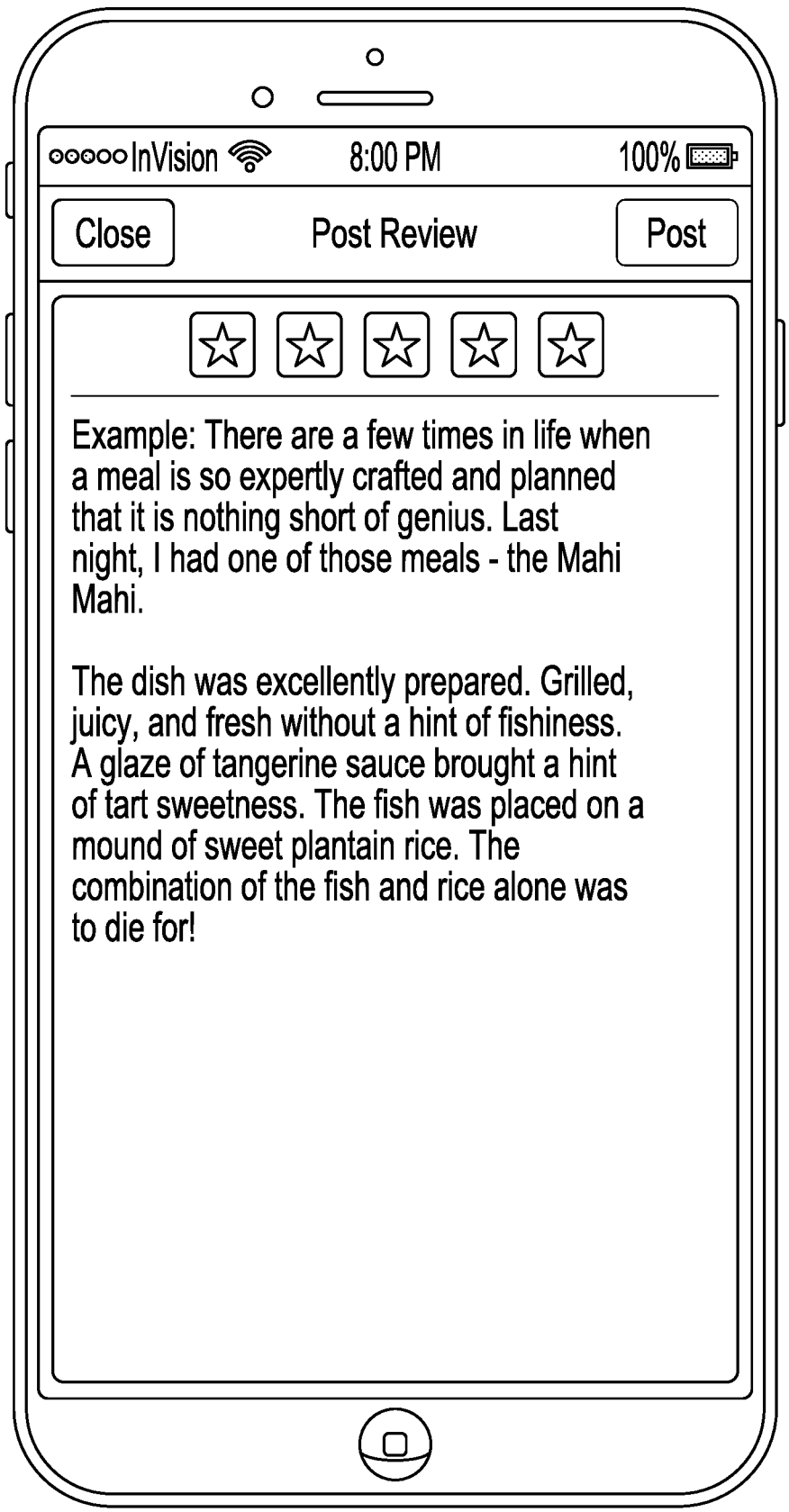
FIG. 9 illustrates an example embodiment of a review.

FIG. 9 illustrates an example embodiment of a review. In some embodiments, the review shown is written in the app shown in FIG. 8.

Figure 10:
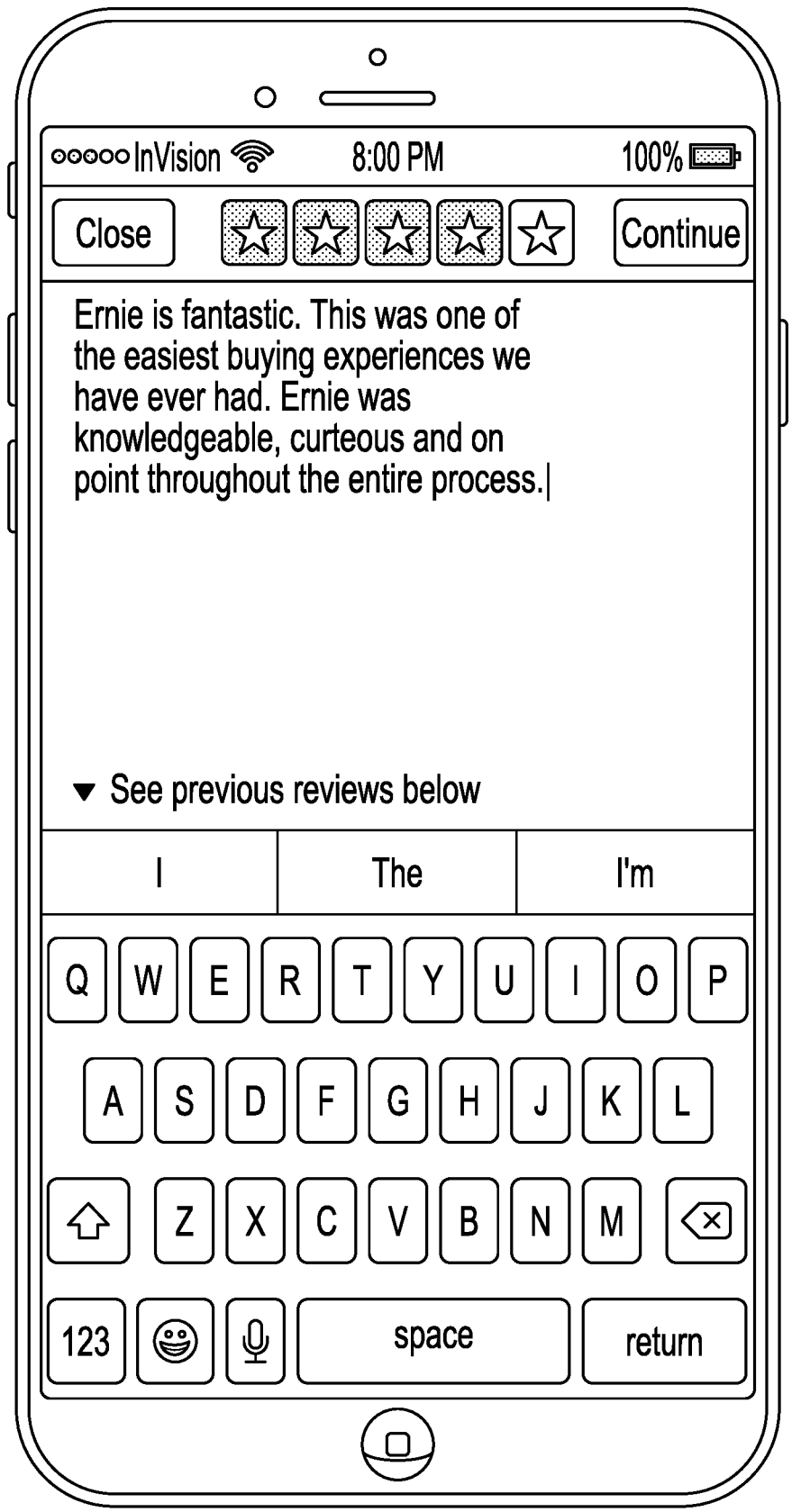
FIG. 10 illustrates an example embodiment of a review.

FIG. 10 illustrates an example embodiment of a review.

Additional Details Regarding Review Site Prioritization

As described above, review sites to which a potential reviewer can be directed to write a review for a business can be prioritized based on determining a need for additional reviews on the source and/or an improvement to the business's reputation score if additional reviews were added to a given review site. For example, review site selection engine 214, as described above, can be configured to prioritize review sites based on how a business's reputation would change (whether positive or negative) based on stimulating the addition of new reviews to the various review sites. Further details regarding leveraging of reputation scoring to target review placement (e.g., prioritizing and selecting what review sites to send a potential reviewer's device to) will be described in further detail below.

Reputation Scoring

Platform 102 is configured to determine a variety of reputation scores on behalf of businesses such as Acme Dentistry. In the case of multiple-location businesses, individual reputation scores are determined for each of the locations, and the scores of individual businesses can be aggregated in a variety of ways. As will be described in more detail below, the scores provide users with perspective on how their businesses are perceived online. Also as will be described in more detail below, users are able to explore the factors that contribute to their businesses' reputation scores by manipulating various interface controls, and they can also learn how to improve their scores. In the case of multi-location businesses, users can segment the locations in a variety of ways to gain additional insight.

Figure 11:
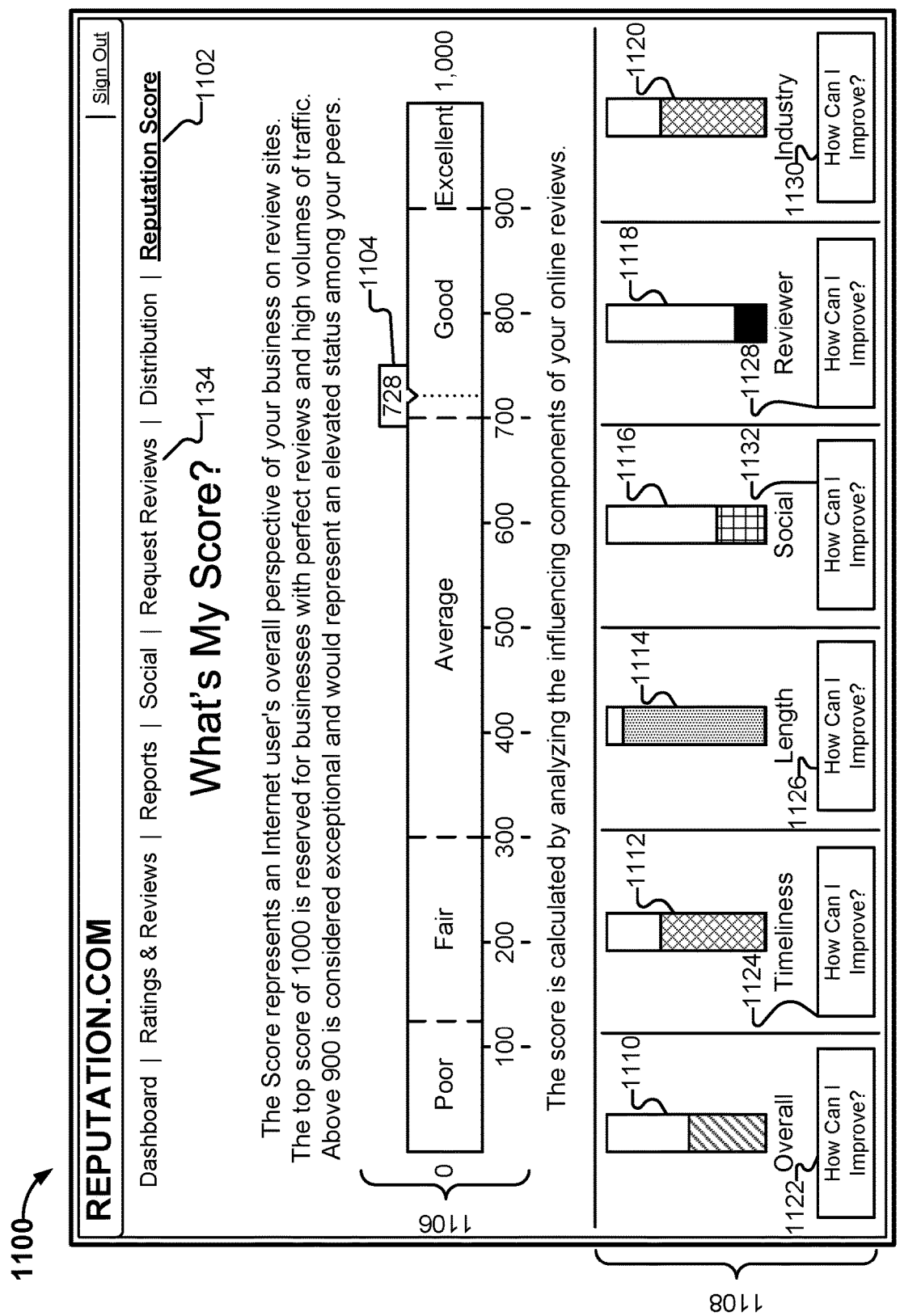
FIG. 11 illustrates an example of an interface as rendered in a browser.

FIG. 11 illustrates an example of an interface as rendered in a browser. In particular, a representative of Acme Dentistry, James, is presented with interface 1100 after logging in to Acme Dentistry's account on platform 102 using a browser application on a client device and clicking on tab option 1102.

In region 1104 of interface 1100, a composite reputation score (728 points) is depicted on a scale 1106. Example ways of computing a composite score are described in conjunction with FIG. 12. The composite reputation score provides James with a quick perspective on how Acme Dentistry is perceived online. A variety of factors can be considered in determining a composite score. Six example factors are shown in region 1108, each of which is discussed below. For each factor, James can see tips on how to improve his score with respect to that factor by clicking on the appropriate box (e.g., box 1122 for tips on improving score 1110). In the example shown in FIG. 11, a recommendation box is present for each score presented in region 1108. In some embodiments, such boxes are only displayed for scores that can/should be improved. For example, given that score 1114 is already very high, in some embodiments, box 1126 is omitted from the interface as displayed to James, or an alternate message is displayed, such as a general encouragement to "keep up the good work."

Overall Score (1110): This value reflects the average review score (e.g., star rating) across all reviews on all review sites. As shown, Acme Dentistry has an average rating of 0.50 across all sites. If James clicks on box 1122, he will be presented with a suggestion, such as the following: "Overall score is the most influential metric. It can appear in both the review site search results and in your general search engine results. Generating a larger volume of positive reviews is the best way to improve the overall score. Typically, volume is the best approach as your average, happy customer will not write a review without being asked." Additionally, personalized advice may also be provided, such as telling James he should click on tab 1134 and request five reviews.

Timeliness (1112): This score indicates how current a business's reviews are (irrespective of whether they are positive or negative). In the example shown, reviews older than two months have less of an impact than more recent reviews. Thus, if one entity has 200 reviews with an average rating of four stars, at least some of which were recently authored, and a second entity has the same volume and star rating but none of the reviews were written in the last two months, the first entity will have a higher timeliness score and thus a higher composite reputation score than the second entity. If James clicks on box 1124, he will be presented with a suggestion, such as the following: "Managing your online reviews is not a one-time exercise, but a continual investment into your business. Encourage a steady trickle of new reviews on a regular basis to ensure that your reviews don't become stale." Other measures of Timeliness can also be used, such as a score that indicates the relative amount of new vs. old positive reviews and new vs. old negative reviews (i.e., to see whether positive or negative reviews dominate in time).

Length (1114): This score indicates the average length of a business's reviews. Longer reviews add weight to the review's rating. If two reviews have the same star rating (e.g., one out of five stars), but the first review is ten words and the second review is 300 words, the second review will be weighted more when computing the composite score than the first review. If James clicks on box 1126, he will be presented with a suggestion, such as the following: "Encourage your positive reviewers to write in-depth reviews. They should detail their experiences and highlight what they like about your business. This provides credibility and the guidance makes review writing easier for them." Other measures of Length can also be used, such as a score that indicates the relative amount of long vs. short positive reviews and long vs. short negative reviews (i.e., to see whether positive or negative reviews dominate in length).

Social Factors (1116): Reviews that have been marked with social indicators (e.g., they have been marked by other members of the review community as being "helpful" or "funny") will have more bearing on the outcome of the composite score. By clicking on box 1132, James will be presented with an appropriate suggestion for improvement.

Reviewer Authority (1118): A review written by an established member of a community (e.g., who has authored numerous reviews) will have a greater impact on the outcome of the composite score than one written by a reviewer with little or no history on a particular review site. In some embodiments, the audience of the reviewer is also taken into consideration. For example, if the reviewer has a large Twitter following, his or her review will have a greater bearing on the outcome of the score. If James clicks on box 1128, he will be presented with a suggestion, such as the following: "Established reviewers can be a major boon to your review page. Their reviews are rarely questioned and their opinions carry significant weight. If you know that one of your customers is an active reviewer on a review site, make a special effort to get him or her to review your business."

Industry (1120): Review sites that are directly related to the vertical in which the entity being reviewed resides are given more weight. For example, if the entity being reviewed is a car dealership and the review site caters specifically to reviews about car dealerships, the reviews in that specific site will have a greater impact on the outcome of the composite score than those on vertically ambiguous websites. If James clicks on box 1130, he will be presented with a suggestion, such as the following: "The most important review sites for your business should have your best reviews. Monitor your website analytics to find the sites having the biggest impact on your business, and reinforce your presence on those sites."

In various embodiments of interface 1100, additional controls for interactions are made available. For example, a control can be provided that allows a user to see individual outlier reviews—reviews that contributed the most to/deviated the most from the overall score (and/or individual factors). As one example, a one-star review that is weighted heavily in the calculation of a score or scores can be surfaced to the user. The user could then attempt to resolve the negative feelings of the individual that wrote the one-star review by contacting the individual. As another example, a particularly important five-star review (e.g., due to being written by a person with a very high reviewer authority score) can be surfaced to the user, allowing the user to contact the reviewer and thank him or her. As yet another example, if an otherwise influential review is stale (and positive), the review can be surfaced to the user so that the user can ask the author to provide an update or otherwise refresh the review.

A variety of weights can be assigned to the above factors when generating the composite score shown in region 1104. Further, the factors described above need not all be employed nor need they be employed in the manners described herein. Additional factors can also be used when generating a composite score. An example computation of a composite score is discussed in conjunction with FIG. 12.

Example Score Generation

Figure 12:
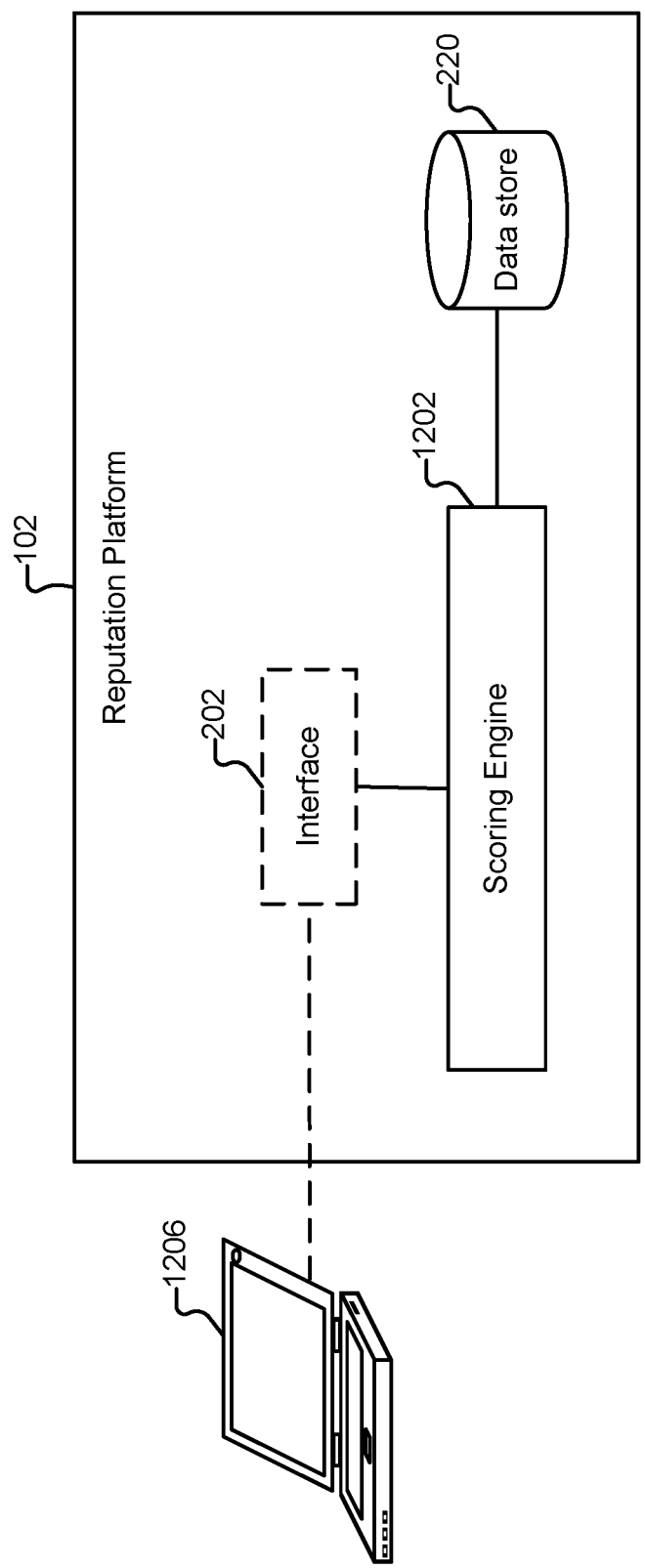
FIG. 12 illustrates an example of components included in an embodiment of a reputation platform.

FIG. 12 illustrates an example of components included in an embodiment of a reputation platform. In particular, FIG. 12 illustrates components of platform 102 that are used in conjunction with generating reputation scores.

In some embodiments, whenever James (e.g., using device 1206) accesses platform 102 (and/or based on the elapsing of a certain amount of time), the composite score shown at 1104 in FIG. 11 is refreshed. In particular, scoring engine 1202 retrieves, from database 220, review and other data pertaining to Acme Dentistry and generates the various scores shown in FIG. 11. Example ways of computing a composite reputation score are as follows.

(1) Base Score

First, scoring engine 1202 computes a base score "B" that is a weighted average of all of the star ratings of all of the individual reviews on all of the sites deemed relevant to Acme Dentistry:

$$B = 100 \cdot \frac{\sum_i^{N_r} s_i w_i}{\sum_i^{N_r} w_i} \cdot \Theta(N_r - N_{min})$$

where "$N_r$" is the total number of reviews, "$s_i$" is the number of "stars" for review "i" normalized to 10, "$w_i$" is the weight for review "i," $\Theta$ is the Heaviside step function, and "$N_{min}$" is the minimum number of reviews needed to score (e.g., 4). The factor 100 is used to expand the score to a value from 0 to 1000.

One example of the function "$w_i$" is as follows:

$$w_i = D_A \cdot T_i \cdot P_i \cdot R_A \cdot S_F \cdot L_F$$

In the above equation, "$D_A$" is the domain authority, which reflects how important the domain is with respect to the business. As one example, a doctor-focused review site may be a better authority for reviews of doctors than a general purpose review site. One way to determine domain authority values is to use the domain's search engine results page placement using the business name as the keyword.

"$R_A$" is the reviewer authority. One way to determine reviewer authority is to take the logarithm of 1+ the number of reviews written by the reviewer. As explained above, a review written by an individual who has authored many reviews is weighted more than one written by a less prolific user.

"$S_F$" is the social feedback factor. One way to determine the factor is to use the logarithm of 1+ the number of pieces of social feedback a review has received.

"$L_F$" is the length factor. One way to specify this value is to use 1 for short reviews, 2 for medium reviews, and 4 for long reviews.

"$T_i$" is the age factor. One way to specify this factor is through the following: If the age is less than two months $T_i=1$, if the age "$a_i$" (in months)>2 months, then the following value is used:

$$T_i = \max(e^{-\omega \cdot (a_i - 2)}, 0.5)$$

where $\omega$ is the time-based decay rate.

"$P_i$" is the position factor for review "i." The position factor indicates where a given review is positioned among other reviews of the business (e.g., it is at the top on the first page of results, or it is on the tenth page). One way to compute the position factor is as follows:

$$P_i = e^{-\frac{p_i}{\lambda}}$$

where $\lambda$ is the positional decay length.

In some cases, a given site may have an overall rating given for the business on the main profile page for that business on the site. In some embodiments, the provided overall rating is treated as an additional review with age $a=a_0$ and position $p=p_0$ and given an additional weight factor of 2.

(2) Normalization

Once the base score has been computed, it is normalized (to generate "$B_{norm}$"). In some embodiments, this is performed by linearly stretching out the range of scores from 8 to 10 to 5 to 10 and linearly squeezing the range of scores from 0 to 8 to 0 to 5.

Optional Correction Factors

In some embodiments, a correction factor "C" is used for the number of reviews in a given vertical and locale:

$$C = a + b \cdot \frac{2}{\pi} \tan^{-1}\left(\frac{2 \cdot N_r}{\overline{N_r}}\right)$$

where "$N_r$" is the number of reviews for the business and the median number of reviews is taken for the business's vertical and locale. An example value for "a" is 0.3 and an example value for "b" is 0.7.

One alternate version of correction factor "C" is as follows:

$$C = a + b \cdot \frac{2}{\pi} \tan^{-1}\left(\frac{2 \cdot N_r}{\min(\max \overline{N_r}, N_{min}), N_{max})}\right)$$

where "$N_{min}$" and "$N_{max}$" are the limits put on the comparator "$N_r$" in the denominator of the argument of the arctan in the correction factor. An example value for "$N_{min}$" is 4 and an example value for "$N_{max}$" is 20.

A randomization correction "R" can also be used:

$$R = \min\left(1000, C \cdot B_{norm} + \frac{\mod(uid, 40) - 20}{N_r}\right)$$

where "C" is a correction factor (e.g., one of the two discussed above), "$B_{norm}$" is the normalized base score discussed above, and "uid" is a unique identifier assigned to the business by platform 102 and stored in database 220. The randomization correction can be used where only a small number of reviews are present for a given business.

Another example of "R" is as follows:

$$R = \max(0, C \cdot B_{norm} - 37.5 \cdot e^{-0.6 \cdot \alpha})$$

where "$\alpha$" is the age of the most recent review.

Additional Examples of Scoring Embodiments

As explained above, a variety of techniques can be used by scoring engine 1202 in determining reputation scores. In some embodiments, scores for all types of businesses are computed using the same sets of rules. In other embodiments, reputation score computation varies based on industry (e.g., reputation scores for car dealers using one approach and/or one set of factors, and reputation scores for doctors using a different approach and/or different set of factors). Scoring engine 1202 can be configured to use a best in class entity when determining appropriate thresholds/values for entities within a given industry. The following are yet more examples of factors that can be used in generating reputation scores.

Review volume: The volume of reviews across all review sites can be used as a factor. For example, if the average star rating and the number of reviews are high, a conclusion can be reached that the average star rating is more accurate than where an entity has the same average star rating and a lower number of reviews. The star rating will carry more weight in the score if the volume is above a certain threshold. In some embodiments, thresholds vary by industry. Further, review volume can use more than just a threshold. For example, an asymptotic function of number of reviews, industry, and geolocation of the business can be used as an additional scoring factor.

Multimedia: Reviews that have multimedia associated with them (e.g., a video review, or a photograph) can be weighted differently. In some embodiments, instead of using a separate multimedia factor, the length score of the review is increased (e.g., to the maximum value) when multimedia is present.

Review Distribution: The population of reviews on different sites can be examined, and where a review distribution strays from the mean distribution, the score can be impacted. As one example, if the review distribution is sufficiently outside the expected distribution for a given industry, this may indicate that the business is engaged in gaming behavior. The score can be discounted (e.g., by 25%) accordingly. An example of advice for improving a score based on this factor would be to point out to the user that their distribution of reviews (e.g., 200 on a first site and only 2 on a second site) deviates from what is expected in the user's industry, and suggest that the user encourages those who posted reviews to different review sites as well.

Text Analysis: Text analysis can be used to extract features used in the score. For example, reviews containing certain key terms (e.g., "visited" or "purchased") can be weighted differently than those that do not.

Figure 13:
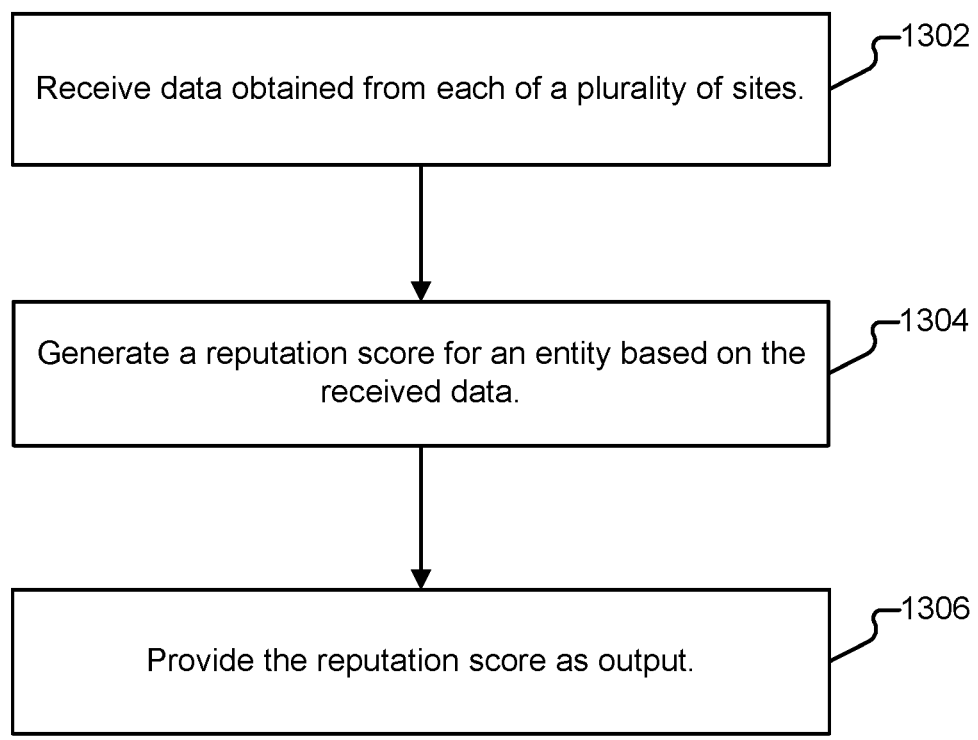
FIG. 13 illustrates an embodiment of a process for generating a reputation score.

FIG. 13 illustrates an embodiment of a process for generating a reputation score. In some embodiments, process 1300 is performed by platform 102. The process begins at 1302 when data obtained from each of a plurality of sites is received. As one example, process 1300 begins at 1302 when Bob logs into platform 102 and, in response, scoring engine 1202 retrieves data associated with Acme Dentistry from database 220. In addition to generating reputation scores on demand, scores can also be generated as part of a batch process. As one example, scores across an entire industry can be generated (e.g., for benchmark purposes) once a week. In such situations, the process begins at 1302 when the designated time to perform the batch process occurs and data is received from database 220. In various embodiments, at least some of the data received at 1302 is obtained on-demand directly from the source sites (instead of or in addition to being received from a storage, such as database 220).

At 1304, a reputation score for an entity is generated. Various techniques for generating reputation scores are discussed above. Other approaches can also be used, such as by determining an average score for each of the plurality of sites and combining those average scores (e.g., by multiplying or adding them and normalizing the result). As mentioned above, in some embodiments, the entity for which the score is generated is a single business (e.g., Acme Dentistry). The score generated at 1304 can also be determined as an aggregate across multiple locations (e.g., in the case of a multi-location business, such as a chain of convenience stores) and can also be generated across multiple businesses (e.g., reputation score for the airline industry), and/or across all reviews hosted by a site (e.g., reputation score for all businesses with profiles on a given site). One way to generate a score for multiple locations (and/or multiple businesses) is to apply scoring techniques described in conjunction with FIG. 12 using as input the pool of reviews that correspond to the multiple locations/businesses. Another way to generate a multi-location and/or multi-business reputation score is to determine reputation scores for each of the individual locations (and/or businesses) and then combine the individual scores (e.g., through addition, multiplication, or other appropriate combination functions).

Finally, at 1306, the reputation score is provided as output. As one example, a reputation score is provided as output in region 1104 of interface 1100. As another example, scoring engine 1202 can be configured to send reputation scores to users via email. The impact of additional reviews on the reputation score for a business can also be modeled and used to determine what review sites additional reviews should be requested on, as will be described in further detail below.

Targeting Review Placement

As explained above (e.g., in the section titled "Additional Examples of Scoring Embodiments"), one factor that can be considered in determining a reputation score for a business is the "review distribution" of the business's reviews. As one example, suppose a restaurant has a review distribution as follows: Of the total number of reviews of the restaurant that are known to platform 102, 10% of those reviews appear on a travel-oriented review site, 50% of those reviews appear on a general purpose review site, and 40% of those reviews appear (collectively) elsewhere. In various embodiments, review site selection engine 214 is configured to compare the review distribution of the business to one or more target distributions and use the comparison to recommend the targeting of additional reviews.

A variety of techniques can be used to determine the target distributions used by review site selection engine 214. For example, as will be described in more detail below, in some embodiments, reputation platform 102 is configured to determine industry-specific review benchmarks. The benchmarks can reflect industry averages or medians, and can also reflect outliers (e.g., focusing on data pertaining to the top 20% of businesses in a given industry). Further, for a single industry, benchmarks can be calculated for different regions (e.g., one for Restaurants-West Coast and one for Restaurants-Midwest). The benchmark information determined by platform 102 can be used to determine target distributions for a business. Benchmark information can also be provided to platform 102 (e.g., by a third party), rather than or in addition to platform 102 determining the benchmark information itself. In some embodiments, a universal target distribution (e.g., equal distribution across all review sites, or specific predetermined distributions) is used globally across all industries.

If a business has a review distribution that is significantly different from a target distribution (e.g., the industry-specific benchmark), the "review distribution" component of the business's reputation score will be negatively impacted. In various embodiments, review site selection engine 214 uses a business's review distribution and one or more target distributions to determine on which site(s) additional reviews should be sought.

Figure 14:
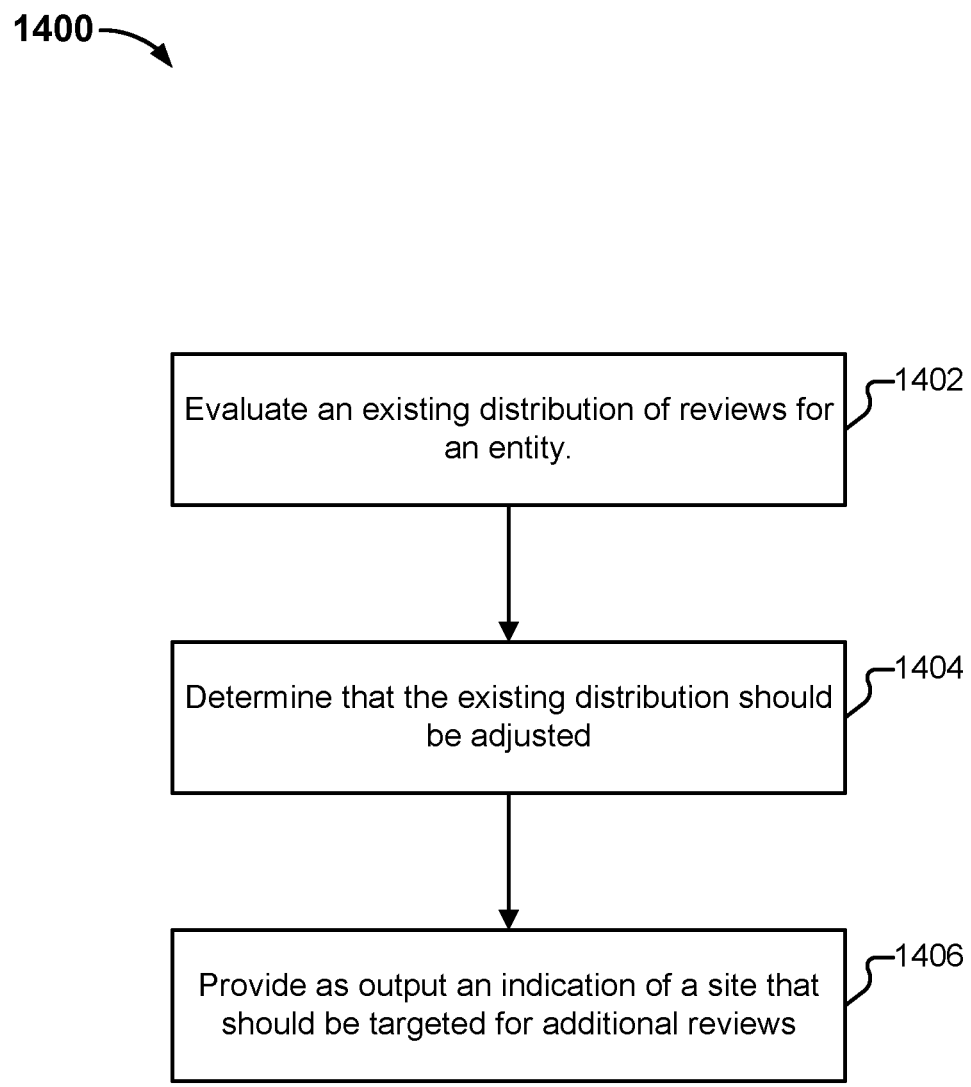
FIG. 14 illustrates an embodiment of a process for targeting review placement.

FIG. 14 illustrates an embodiment of a process for targeting review placement. In some embodiments process 1400 is performed by review site selection engine 214. The process begins at 1402 when an existing distribution of reviews for an entity is evaluated across a plurality of review sites. A determination is made, at 1404, that the existing distribution should be adjusted. Finally, at 1406, an indicator of at least one review site on which placement of at least one additional review should be targeted is provided as output.

One example of process 1400 is as follows: Once a week, the review distribution for a single location dry cleaner ("Mary's Dry Cleaning") is determined by platform 102. In particular, it is determined that approximately 30% of Mary's reviews appear on a first site, approximately 30% appear on a second site, and 40% of Mary's reviews appear elsewhere (1402). Suppose a target distribution for a dry cleaning business is: 70% on site A, 10% on site B, and 20% remainder. Mary's review distribution is significantly different from the target, and so, at 1404 a determination is made that adjustments to the distribution should be sought. At 1406, review site selection engine request engine 214 provides as output an indication that Mary's could use significantly more reviews on site A. The output can take a variety of forms. For example, the output can be used to prioritize a list of review sources, based on the need to adjust review distributions on certain sites (e.g., prioritizing site A as the first site to which a potential reviewer should be directed since it could use significantly more reviews). As another example, platform 102 can send an email alert to the owner of Mary's Dry Cleaning informing her that she should visit platform 102 to help correct the distribution imbalance.

As will be described in more detail below, in some embodiments, the target distribution is multivariate, and includes, in addition to a proportion of reviews across various sites, information such as target timeliness for the reviews, a review volume, and/or a target average score (whether on a per-site basis, or across all applicable sites). Multivariate target distributions can also be used in process 1400. For example, suppose that after a few weeks of requesting reviews (e.g., using process 1400), the review distribution for Mary's Dry Cleaning is 68% site A, 12% site B, and 20% remainder (1402). The site proportions in her current review distribution are quite close to the target. However, other aspects of her review distribution may nonetheless deviate significantly from aspects of a multivariate target and need adjusting to bring up her reputation score. For example, the industry target may be a total of 100 reviews (i.e., total review volume) and Mary's Dry Cleaning may only have 80 total reviews. Or, the industry target average age of review may be six months, while the average age for Mary's Dry Cleaning is nine months. Decisions made at 1404 to adjust the existing review distribution can take into account such non-site-specific aspects as well. In some embodiments these additional aspects of a target distribution are included in the distribution itself (e.g., within a multivariate distribution). In other embodiments, the additional information is stored separately (e.g., in a flat file) but is nonetheless used in conjunction with process 1400 when determining which sites to target for additional reviews. Additional information regarding multivariate distribution targets is provided below (e.g., in the section titled "Industry Review Benchmarking").

Another example of process 1400 is as follows: Once a week, the review distribution of each location of a ten-location franchise is determined (1402). Comparisons against targets can be done individually on behalf of each location, e.g., with ten comparisons being performed against a single, industry-specific target. Comparisons can also be performed between the locations. For example, of the ten locations, the location having the review distribution that is closest to the industry-specific target can itself be used to create a review target for the other stores. The review distributions of the other stores can be compared against the review distributions of the top store, instead of or in addition to being compared against the industry target.

In some embodiments, additional processing is performed in conjunction with process 1400. For example, as part of (or prior to) portion 1402 of the process, a determination can be made as to whether or not the entity has a presence on (e.g., has a registered account with) each of the sites implicated in the target distribution. If an entity is expected to have a non-zero number of reviews on a given site (in accordance with the target distribution), having a presence on that site is needed. As one example, a car dealer business should have an account on a car dealer review site. A restaurant need not have an account on the site, and indeed may not qualify for an account on the site. If the car dealer business does not have an account with the car dealer review site, a variety of actions can be taken by platform 102. As one example, an alert that the car dealer is not registered with a site can be emailed to an administrator of the car dealer's account on platform 102. As another example, the output provided at 1406 can include, e.g., in a prominent location, a recommendation that the reader of the output register for an account with the car dealer review site. In some embodiments, platform 102 is configured to register for an account on (or otherwise obtain a presence on) the site, on behalf of the car dealer.

Industry Review Benchmarking

As discussed above, review site selection engine 214 can use a variety of target distributions, obtained in a variety of ways, in performing process 1400. Two examples of target distributions are depicted in FIGS. 15 and 16, respectively.

Figure 15:
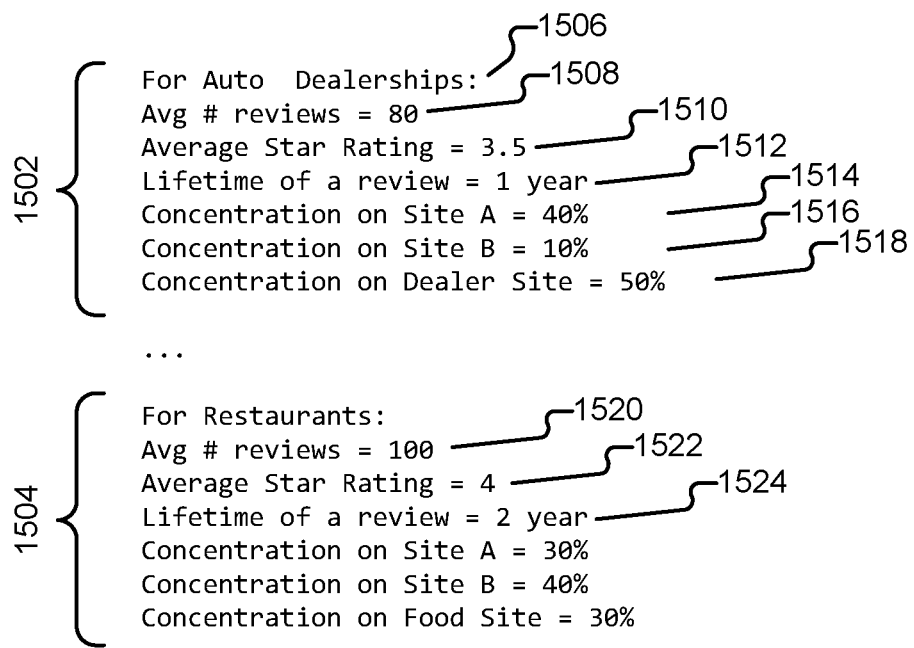
FIG. 15 illustrates an example of a target distribution.

The target distributions shown in FIG. 15 are stored as groups of lines (1502, 1504) in a single flat file, where an empty line is used as a delimiter between industry records. The first line (e.g., 1506) indicates the industry classification (e.g., Auto Dealership). The second line (e.g., 1508) indicates a target review volume across all websites (e.g., 80). The third line (e.g., 1510) indicates the industry average review rating, normalized to a 5 point scale (e.g., 3.5). The fourth line (e.g., 1512) indicates for how long of a period of time a review will be considered "fresh" (e.g., 1 year) and thus count in the calculation of a business in that industry's reputation score. In some embodiments, in addition to or instead of a specific freshness value, a decay factor is included that is used to reduce the impact of a particular review in the calculation of a business's reputation score over time. The remaining lines of the group (1514-1518) indicate what percentage of reviews should appear on which review sites. For example, 40% of reviews should appear on general purpose review site A; 10% of reviews should appear on travel review site B; and 50% of reviews should appear on a review site focused on auto dealers.

As shown in FIG. 15, different industries can have different values in their respective records. For example, a target review volume for restaurants is 100 (1520), the industry average review rating is 4 (1522), and the freshness value is two years (1524). The target review distribution is also different.

The target distributions depicted in FIG. 16 can be used to model the impact that additional reviews would have for a business. For example, for a given car dealer business, simulations of additional reviews (e.g., five additional positive reviews obtained on site A vs. three additional positive reviews obtained on site B) can be run, and a modeled reputation score (e.g., using techniques described in "Example Score Generation" above) determined. Whichever simulation results in the highest reputation score can be used to generate output at 1406 in process 1400.

The impacts on the reputation score simulated by adding additional reviews on various review sites can be used to prioritize the review sites at 306 of process 300. For example, simulations of additional reviews on an identified list of review sites for a business (as described above at 306 of process 300) can be performed. A particular review site is prioritized highest if simulation of additional reviews on the particular review site results in the highest modeled reputation score. The next review site in the prioritized list is the one whose simulation results in the next highest reputation score. The remaining review sites are similarly prioritized based on simulation of additional reviews and resulting modeled reputation scores.

FIG. 16 illustrates another example of a target distribution. For a given business, the first two columns of table 1600 list an industry (1602) and sub-industry (1604). The next column lists the target review volume (1606). The remaining columns provide target review proportions with respect to each of sites 1608-1624. As shown in FIG. 16, many of the cells in the table are empty, indicating that, for a given type of business, only a few review sites significantly impact the reputations of those businesses. For example, while car dealers and car rental businesses are both impacted by reviews on sites A-C (1608-1612), reviews on site 1622 (a dealer review site) are important to car dealers, but not important to car rental businesses (or entirely different industries, such as restaurants). As another example, reviews of hospitals appearing on a health review site 1614 are almost as important as reviews appearing on site A. However, reviews appearing on site 1614 are considerably less important to elder care businesses, while reviews on a niche nursing review site 1618 matter for nursing homes but not hospitals.

A small subset of data that can be included in a distribution (also referred to herein as an industry table) is depicted in FIG. 16. In various embodiments, hundreds of rows (i.e., industries/sub-industries) and hundreds of columns (i.e., review sites) are included in the table. Further, additional types of information can be included in table 1600, such as freshness values, review volume over a period of time (e.g., three reviews per week), decay factors, average scores, etc.

As previously explained, target distributions can be provided to platform 102 in a variety of ways. As one example, an administrator of platform 102 can manually configure the values in the file depicted in FIG. 15. As another example, the top business in each category (i.e., the business having the highest reputation score) can be used as a model, and its values copied into the appropriate area of file depicted in FIG. 15, whether manually or programmatically. As yet another example, process 1700 can be used to generate target distribution 1600.

Figure 17:
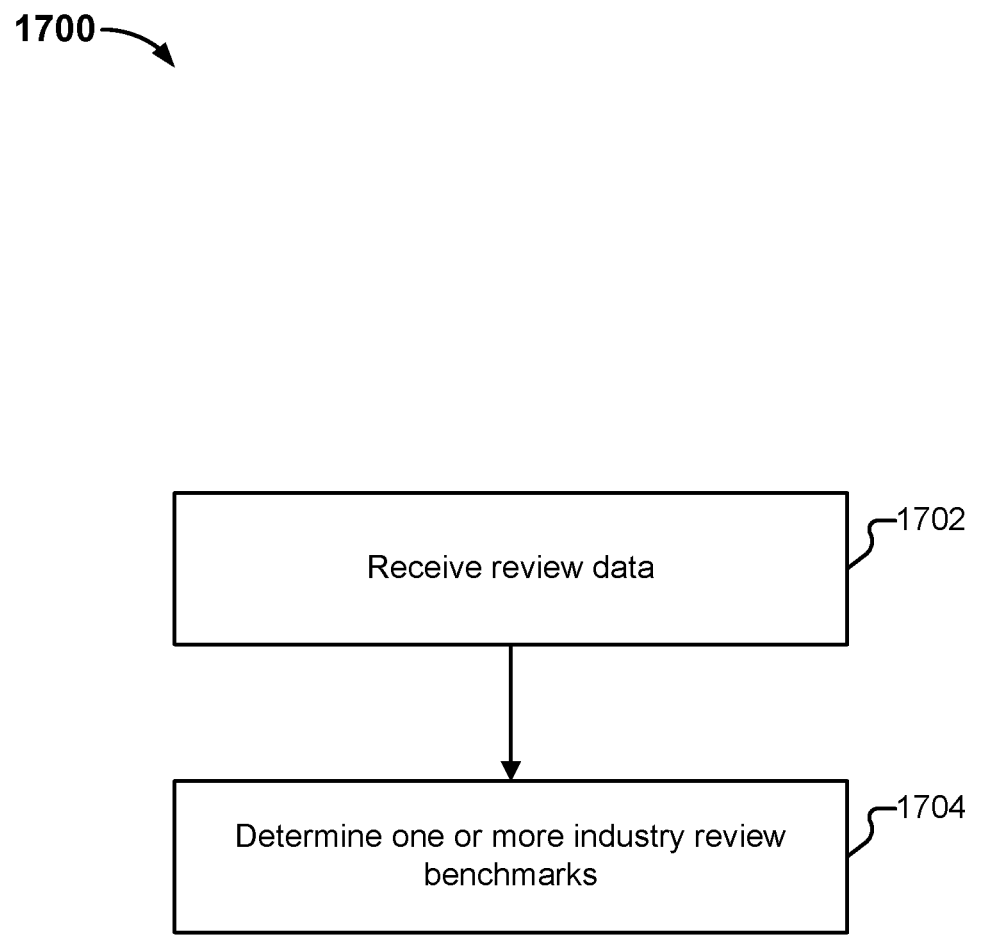
FIG. 17 illustrates an embodiment of a process for performing an industry review benchmark.

FIG. 17 illustrates an embodiment of a process for performing an industry review benchmark. In some embodiments, process 1700 is performed by platform 102 to create/maintain industry table 1600. For example, platform 102 can be configured to execute process 1700 once a month. Platform 102 can also execute process 1700 more frequently, and/or can execute process 1700 at different times with respect to different industries (e.g., with respect to automotive industries one day each week and with respect to restaurants another day each week), selectively updating portions of table 1600 instead of the entire table at once. In some embodiments, process 1700 is performed multiple times, resulting in multiple tables. For example, platform 102 can be configured to generate region-specific tables.

The process begins at 1702 when review data is received. As one example, at 1702, platform 102 queries database 220 for information pertaining to all automotive sales reviews. For each automotive sales business (e.g., a total of 16,000 dealers), summary information such as each dealer's current reputation score, current review distribution, and current review volume is received at 1702.

At 1704, the received data is analyzed to determine one or more benchmarks. As one example, platform 102 can be configured to average the information received at 1702 into a set of industry average information (i.e., the average reputation score for a business in the industry; the averaged review distribution; and the average review volume). Platform 102 can also be configured to consider only a portion of the information received at 1702 when determining a benchmark, and/or can request information for a subset of businesses at 1702. As one example, instead of determining an industry average at 1704, platform 102 can consider the information pertaining to only those businesses having reputation scores in the top 20% of the industry being benchmarked. In some embodiments, multiple benchmarks are considered (e.g., in process 1400) when making determinations. For example, both an industry average benchmark and a "top 20%" benchmark can be considered (e.g., by being averaged themselves) when determining a target distribution for a business.

In some embodiments, additional processing is performed at 1704 and/or occurs after 1704. For example, a global importance of a review site (e.g., its Page Rank or Alexa Rank) is included as a factor in the target distribution, or is used to weight a review site's values in table 1600.

In various embodiments, the industry benchmarked during process 1700 is segmented and multiple benchmarks are determined (e.g., one benchmark for each segment, along with an industry-wide benchmark). As one example, suppose the industry being benchmarked is Fast Food Restaurants. In some embodiments, in addition to an industry-wide benchmark, benchmarks are determined for various geographic sub-regions. One reason for performing regional benchmarking is that different populations of people may rely on different review websites for review information. For example, individuals on the West Coast may rely heavily on a particular site for reviews of restaurants, while individuals in the Midwest may rely heavily on a different site. In order to improve its reputation score, a restaurant located in Ohio will likely benefit from a review distribution that more closely resembles that of other Midwestern restaurants than a nationwide average distribution.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive a message requesting a potential reviewer to write a review for an entity, wherein the message includes a first link, and wherein at least one of an identifier of the entity or an identifier of the potential reviewer is encoded in the first link;
in response to a user interaction with at least a portion of the message, provide an indication that the potential reviewer has accepted the request to write the review for the entity;
subsequent to providing the indication that the potential reviewer has accepted the request to write the review for the entity, receive an indication of an online review site on which the potential reviewer should write the review for the entity, wherein the online review site was selected, by a remote entity, from a plurality of online review sites; and
based at least in part on the received indication of the online review site on which the potential reviewer should write the review, attempt to launch an application associated with the selected online review site, wherein the received indication of the online review site comprises a second link that is formatted such that a browser is caused to attempt to open the application to a profile of the entity; and
a memory coupled to the one or more processors and configured to provide the one or more processors with instructions.

2. The system recited in claim 1, wherein the message comprises either a text message or an email communication.

3. The system recited in claim 1, wherein the user interaction comprises clicking of the first link embedded in the message, wherein clicking of the first link directs a device associated with the potential reviewer to the remote entity, and wherein the remote entity is configured to select the online review site subsequent to the direction of the device to the remote entity.

4. The system recited in claim 1, wherein the online review site is selected based at least in part on information associated with a mobile device associated with the potential reviewer.

5. The system recited in claim 4, wherein the mobile device information comprises at least one of an operating system, device type, or mobile ecosystem.

6. The system recited in claim 5, wherein the remote entity is configured to determine the mobile device information based at least in part on at least one of a user agent or browser type information obtained from the mobile device associated with the potential reviewer.

7. The system recited in claim 1, wherein the one or more processors are further configured to transmit a callback to the remote entity based at least in part on the attempt to launch the application, and wherein based at least in part on the callback, the remote entity is configured to determine that the application was not launched.

8. The system recited in claim 1, wherein the remote entity is configured to determine that the application was launched based at least in part on an absence of a callback within a timeout period.

9. A method, comprising:
receiving a message requesting a potential reviewer to write a review for an entity, wherein the message includes a first link, and wherein at least one of an identifier of the entity or an identifier of the potential reviewer is encoded in the first link;
in response to a user interaction with at least a portion of the message, providing an indication that the potential reviewer has accepted the request to write the review for the entity;
subsequent to providing the indication that the potential reviewer has accepted the request to write the review for the entity, receiving an indication of an online review site on which the potential reviewer should write the review for the entity, wherein the online review site was selected, by a remote entity, from a plurality of online review sites; and
based at least in part on the received indication of the online review site on which the potential reviewer should write the review, attempting to launch an application associated with the selected online review site, wherein the received indication of the online review site comprises a second link that is formatted such that a browser is caused to attempt to open the application to a profile of the entity.

10. The method of claim 9, wherein the message comprises either a text message or an email communication.

11. The method of claim 9, wherein the user interaction comprises clicking of the first link embedded in the message, wherein clicking of the first link directs a device associated with the potential reviewer to the remote entity, and wherein the remote entity is configured to select the online review site subsequent to the direction of the device to the remote entity.

12. The method of claim 9, wherein the online review site is selected based at least in part on information associated with a mobile device associated with the potential reviewer.

13. The method of claim 12, wherein the mobile device information comprises at least one of an operating system, device type, or mobile ecosystem.

14. The method of claim 13, wherein the remote entity is configured to determine the mobile device information based at least in part on at least one of a user agent or browser type information obtained from the mobile device associated with the potential reviewer.

15. The method of claim 9, further comprising transmitting a callback to the remote entity based at least in part on the attempt to launch the application, and wherein based at least in part on the callback, the remote entity is configured to determine that the application was not launched.

16. The method of claim 9, wherein the remote entity is configured to determine that the application was launched based at least in part on an absence of a callback within a timeout period.

17. A computer program product embodied in a non-transitory computer readable storage medium, and comprising computer instructions for:

receiving a message requesting a potential reviewer to write a review for an entity, wherein the message includes a first link, and wherein at least one of an identifier of the entity or an identifier of the potential reviewer is encoded in the first link;

in response to a user interaction with at least a portion of the message, providing an indication that the potential reviewer has accepted the request to write the review for the entity;

subsequent to providing the indication that the potential reviewer has accepted the request to write the review for the entity, receiving an indication of an online review site on which the potential reviewer should write the review for the entity, wherein the online review site was selected, by a remote entity, from a plurality of online review sites; and based at least in part on the received indication of the online review site on which the potential reviewer should write the review, attempting to launch an application associated with the selected online review site, wherein the received indication of the online review site comprises a second link that is formatted such that a browser is caused to attempt to open the application to a profile of the entity.

* * * * *